(12) United States Patent
Suddamalla et al.

(10) Patent No.: US 11,904,843 B2
(45) Date of Patent: Feb. 20, 2024

(54) AUTONOMOUS PARKING SYSTEMS AND METHODS FOR VEHICLES

(71) Applicant: MOOVITA PTE LTD, Singapore (SG)

(72) Inventors: Upendra Suddamalla, Singapore (SG); Ravichandiran Balaji, Singapore (SG); Anthony Wong, Singapore (SG); Dilip Kumar Limbu, Singapore (SG)

(73) Assignee: MOOVITA PTE LTD, Singapore (SG)

( * ) Notice: Subject to any disclaimer, the term of this patent is extended or adjusted under 35 U.S.C. 154(b) by 225 days.

(21) Appl. No.: 17/430,715

(22) PCT Filed: Dec. 18, 2020

(86) PCT No.: PCT/SG2020/050765
§ 371 (c)(1),
(2) Date: Aug. 12, 2021

(87) PCT Pub. No.: WO2021/126090
PCT Pub. Date: Jun. 24, 2021

(65) Prior Publication Data
US 2022/0153259 A1 May 19, 2022

Related U.S. Application Data

(60) Provisional application No. 62/949,451, filed on Dec. 18, 2019.

(51) Int. Cl.
*G06K 9/00* (2022.01)
*B60W 30/06* (2006.01)
(Continued)

(52) U.S. Cl.
CPC .............. *B60W 30/06* (2013.01); *G06T 7/20* (2013.01); *G06T 7/70* (2017.01); *G06T 7/80* (2017.01);
(Continued)

(58) Field of Classification Search
CPC ...... B60W 30/06; B60W 40/02; B60W 50/00; G06T 7/20; G06T 7/70; G06T 7/80;
(Continued)

(56) References Cited

U.S. PATENT DOCUMENTS 11,346,764 B2 * 5/2022 Chou ................. G01N 15/1468
2012/0133769 A1 * 5/2012 Nagamine ............... G06T 7/246
348/148
(Continued)

FOREIGN PATENT DOCUMENTS

KR 20160123668 A 10/2016
KR 20170118499 A 10/2017

*Primary Examiner* — Dhaval V Patel
(74) *Attorney, Agent, or Firm* — HORIZON IP PTE LTD

(57) ABSTRACT

A method and system for autonomous parking are disclosed. The system employs Homography guided motion segmentation (HGMS) to determine the availability of a parking slot. A free parking slot is determined based on an occupancy status check and identified structures of parking lines. For example, motion analysis is performed on successive images captured by a camera unit to determine the occupancy status of a parking slot. Information of the free parking slot, for example, the dimensions and orientation, may be determined from identifying the structure of parking lines. This information is used by the system to guide a vehicle from its current location to the detected free parking slot.

17 Claims, 23 Drawing Sheets

(51) Int. Cl.
  *G06T 7/80*  (2017.01)
  *G06T 7/70*  (2017.01)
  *G06V 20/40*  (2022.01)
  *G06V 20/58*  (2022.01)
  *G06V 20/56*  (2022.01)
  *G06T 7/20*  (2017.01)

(52) U.S. Cl.
  CPC ............ *G06V 20/46* (2022.01); *G06V 20/586* (2022.01); *G06V 20/588* (2022.01); *G06T 2207/30261* (2013.01); *G06T 2207/30264* (2013.01)

(58) Field of Classification Search
  CPC . G06T 2207/30261; G06T 2207/30264; G06T 7/215; G06V 20/46; G06V 20/586; G06V 20/588; G08G 1/168
  See application file for complete search history.

(56) References Cited

U.S. PATENT DOCUMENTS

| | | | |
|---|---|---|---|
| 2015/0339924 A1* | 11/2015 | Cook | G06V 20/52 382/104 |
| 2016/0232789 A1* | 8/2016 | Chan | G08G 1/144 |
| 2018/0095474 A1* | 4/2018 | Batur | G05D 1/0246 |
| 2018/0246515 A1 | 8/2018 | Iwama et al. | |
| 2020/0089974 A1* | 3/2020 | Ding | B62D 15/0285 |
| 2020/0134331 A1* | 4/2020 | Poddar | G06T 11/00 |

\* cited by examiner

615

| Method | Precision | Recall | F1 Score |
|---|---|---|---|
| Gradient | 0.91 | 0.75 | 0.82 |
| YOLO-160 default | 0.81 | 1.0 | 0.89 |
| YOLO-160 custom | 0.96 | 1.0 | 0.98 |
| HGMS | 0.98 | 0.95 | 0.97 |

Fig. 11b

AUTONOMOUS PARKING SYSTEMS AND METHODS FOR VEHICLES

CROSS-REFERENCE TO RELATED APPLICATION

This application claims the benefit of U.S. Provisional Application Ser. No. 62/949,451, filed on Dec. 18, 2019, which is herein incorporated by reference in its entirety for all purposes.

FIELD OF THE INVENTION

The present disclosure relates to systems and methods for automatically parking a vehicle.

BACKGROUND

Autonomous driving (AD) has emerged to enable vehicles to navigate from one location to another with no human input. AD is achieved by including sensors to capture data which is analyzed by advanced data algorithms to evaluate the vehicle surroundings and making appropriate decisions for navigation.

Salient to AD is autonomous parking. To park a vehicle autonomously, it is required to understand the parking slot position, dimensions, and occupancy status. Conventional autonomous parking techniques employ sensors, such as Lidars, ultrasonic range detectors, radars, and/or cameras. Although such conventional techniques can find a suitable parking space or slot, they are unable to determine the correct positioning and boundary of a parking slot. The demarcation of a parking slot indicates the area allocated for a vehicle. Failure to accurately determine the boundary of a parking slot may lead to an improper parking maneuver, resulting in occupying more than one slot and or in a wrong orientation. Additionally, conventional techniques have problems handling variations in obstacles as well as variations in the environment.

From the foregoing discussion, it is desirable to provide an autonomous parking system and methods which can accurately determine a parking slot despite variations in obstacles and the environment with real-time performance.

SUMMARY

Embodiments generally relate to systems and methods for autonomous parking systems for vehicles. In one embodiment, the system includes an autonomous parking system for a vehicle including a detection subsystem having an image capture module for capturing images to provide a camera stream, and a processor module. The processor module receives the camera stream and processes the camera stream. The processor module is configured to process frames of images including processing a current frame and a previous frame of the camera stream to identify a parking slot, to check the parking slot to determine if it is occupied using motion analysis, and if unoccupied, to validate the unoccupied parking slot to determine if the unoccupied parking slot is suitable for the vehicle.

In another embodiment, a method for autonomously parking a vehicle includes performing motion analysis of a current image frame and a previous image frame from an image capture module to determine a parking slot, checking the parking slot to determine if the parking slot is occupied, and validating the parking slot if the parking slot is unoccupied based on a vehicle size and a parking slot size.

These and other advantages and features of the embodiments herein disclosed, will become apparent through reference to the following description and the accompanying drawings. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of various embodiments. In the following description, various embodiments of the present disclosure are described with reference to the following, in which:

FIG. 11b shows a table of scores for performance indicators for the different types of systems related to detecting a free parking slot.

DETAILED DESCRIPTION

Embodiments described herein generally relate to autonomous driving systems for a vehicle, such as a car. In particular, the embodiments relate to an autonomous parking system. The autonomous parking system includes parking slot detection and occupancy check using homography guided motion segmentation (HGMS).

Figure 1A:
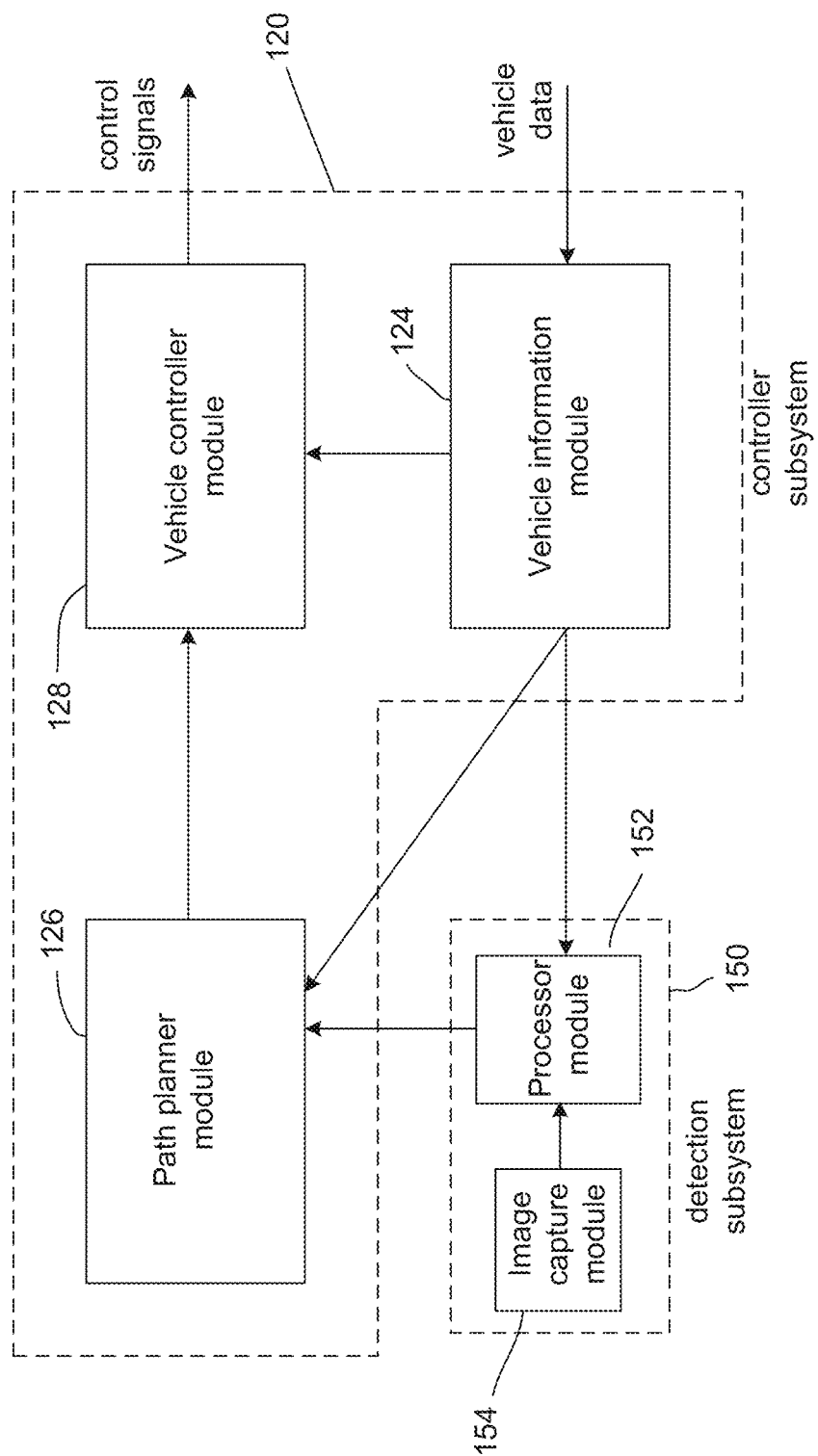
FIG. 1a shows a simplified block diagram of an autonomous parking system.

FIG. 1a shows a simplified embodiment of an autonomous parking system 100 for vehicles, such as cars. Other types of motor vehicles may also be useful. As shown, the parking system includes a controller subsystem 120 and a detection subsystem 150. The detection subsystem includes a processor module 152 and an image capture module 154. As for the controller subsystem, it includes a vehicle information module 124, a path planner module 126, and a vehicle controller module 128. The subsystems are configured to detect a parking slot using, for example, the structure of parking lines, check on the occupancy status, and direct the vehicle into an unoccupied parking slot.

Regarding the detection subsystem, the image capture module captures images of potential parking slots. For example, the image capture module includes camera units for capturing images of potential parking slots. In one embodiment, the image capture module includes 2 camera units, one mounted on each side of the vehicle to capture images from the sides of the vehicle as it is traveling. The camera units stream images for processing by the processor module. Each camera unit provides a camera stream for processing. In one embodiment, a camera stream includes images in which 2 consecutive images or image frames of the camera stream should capture the same position or object with small apparent motion while the vehicle is traveling. The capture rate, for example, depends on the speed of the vehicle. When a vehicle is searching for a parking slot, the speed of the vehicle may be about less than or equal to 10 km/hour. Other speeds may also be useful. The capture rate of the camera units may be, for example, about 20 frames per second for a vehicle travelling at about 10 km/hour. Other capture rates may also be useful, depending on the speed of the vehicle. The camera units may be configured to capture images at varying rates based on vehicle speed.

A capture control unit may control the capture rate of the camera units based on the vehicle speed. The capture control unit may be part of the image capture module. Other configurations of the capture control unit may also be useful. For example, the capture control unit may be part of the processor module.

The processor module processes the captured images to identify an unoccupied parking slot. For example, the processor module may include a central processing unit (CPU) and memory for processing the images. In some embodiment, the CPU may be an 8-core CPU, such as the i7-7700 HQ CPU from Intel. Other types of CPUs may also be useful. In one embodiment, the processor module identifies an unoccupied parking slot using HGMS. In one embodiment, the processor module determines a parking slot using the structure of parking lines and the occupancy status check. The use of HGMS to determine an unoccupied parking slot can be achieved with the desired time and accuracy performance without the need for high-performance processors, such as a graphics processor unit (GPU). This reduces the costs of the autonomous parking system.

As for the controller subsystem, it provides information for the detection subsystem to determine an unoccupied parking slot based on vehicle information or data received from the vehicle's system and to guide the vehicle into the unoccupied parking slot once it is identified. For example, vehicle information may include vehicle location and vehicle dimensions. Once a free slot is identified, the detection subsystem provides the slot location with respect to the vehicle location.

In one embodiment, vehicle data is provided by the vehicle's system or systems. For example, vehicle data may include ego motion values such as speed, direction of travel, and inertial measurement unit (IMU) values. In addition, current location and the size of the vehicle are provided. The vehicle data is provided to the vehicle information module. Other types of vehicle data may also be provided. The various information may be received from the vehicle's control system, global positioning system (GPS), Ego motion system as well as other systems.

The vehicle information module passes vehicle data to various modules of the controller subsystem as well as to the detection subsystem. For example, vehicle data is passed to the processor module of the detection subsystem as well as the path planner module and the vehicle controller module of the controller subsystem.

Once a parking slot is detected, the detection subsystem uses the vehicle data, such as the size of the vehicle, to determine whether the parking slot is suitable for the vehicle. For example, the detection subsystem determines whether the vehicle can fit into the dimensions of the parking slot. If the slot is suitable, it is validated as an available parking slot. In addition, vehicle speed may be provided to the detection subsystem to control the capture rate of the camera units.

Once a parking slot is validated, the information related to the parking slot is provided to the path planner module. For example, the GPS location of the validated parking slot, width and length of the parking slot, as well as the distance and orientation from the current vehicle location are provided to the path planner. Based on the information received, the path planner generates a path for the vehicle to the validated parking slot, including angle (perpendicular) or parallel parking of the vehicle based on the slot orientation.

The path to the validated parking slot is passed to the vehicle controller module. Based on the path, the vehicle controller module sends control signals to the vehicle to guide the vehicle into the validated parking slot. The information may include speed, steering angle and braking information.

Figure 1B:
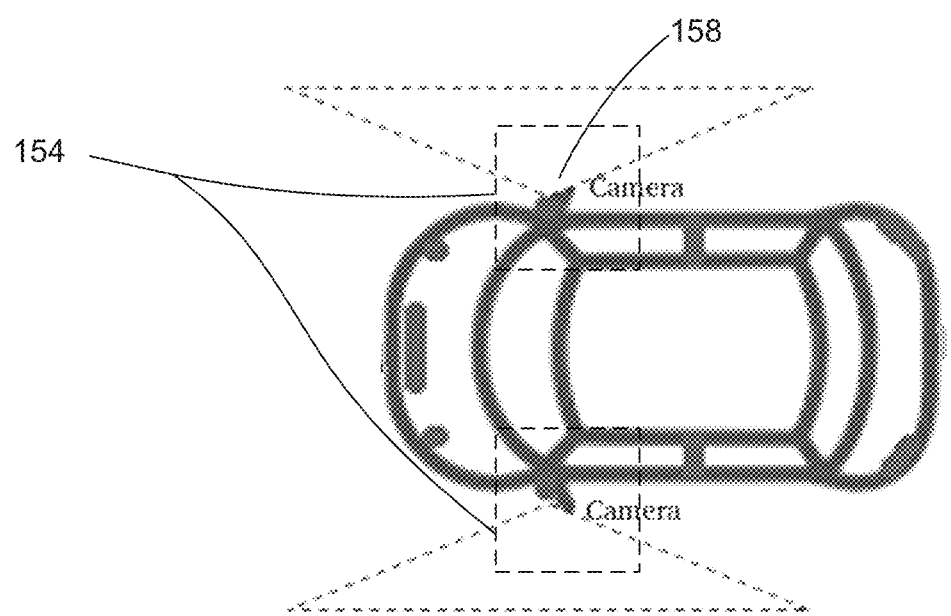
FIG. 1b shows an image capture module of the detection subsystem.

FIG. 1b shows an image capture module 154 of the detection subsystem. As shown, the image capture module includes camera units 158 mounted on the sides of the vehicle. A camera unit includes a camera. Preferably, the camera of a camera unit is a wide-angle camera. For example, the wide-angle camera may have a 120° wide-angle lens. Other angles for the wide-angle lens may also be useful. In one embodiment, a camera unit is mounted with a pitch and at a position on the vehicle which enables capturing of an area between about 0.3 to 5 m. For example, a wide-angle camera is mounted at a position at or near the side view mirrors of the vehicle with a pitch of about 20°. Other positions and pitch configurations for capturing other sized areas may also be useful.

The resolution of the camera should be adequate to capture and process the images to determine an unoccupied parking slot with sufficient accuracy within the desired time performance requirements. The camera resolution may be programmable. In one embodiment, the resolution of the camera may be about 150 k to 250 k pixels. For example, resolution may be about 416×416 or 640×360. Other camera resolutions may also be useful. The desired resolutions may depend on processor speed and time performance requirements. The higher the resolution, the longer it takes to process for a given processor performance.

Figure 2A:
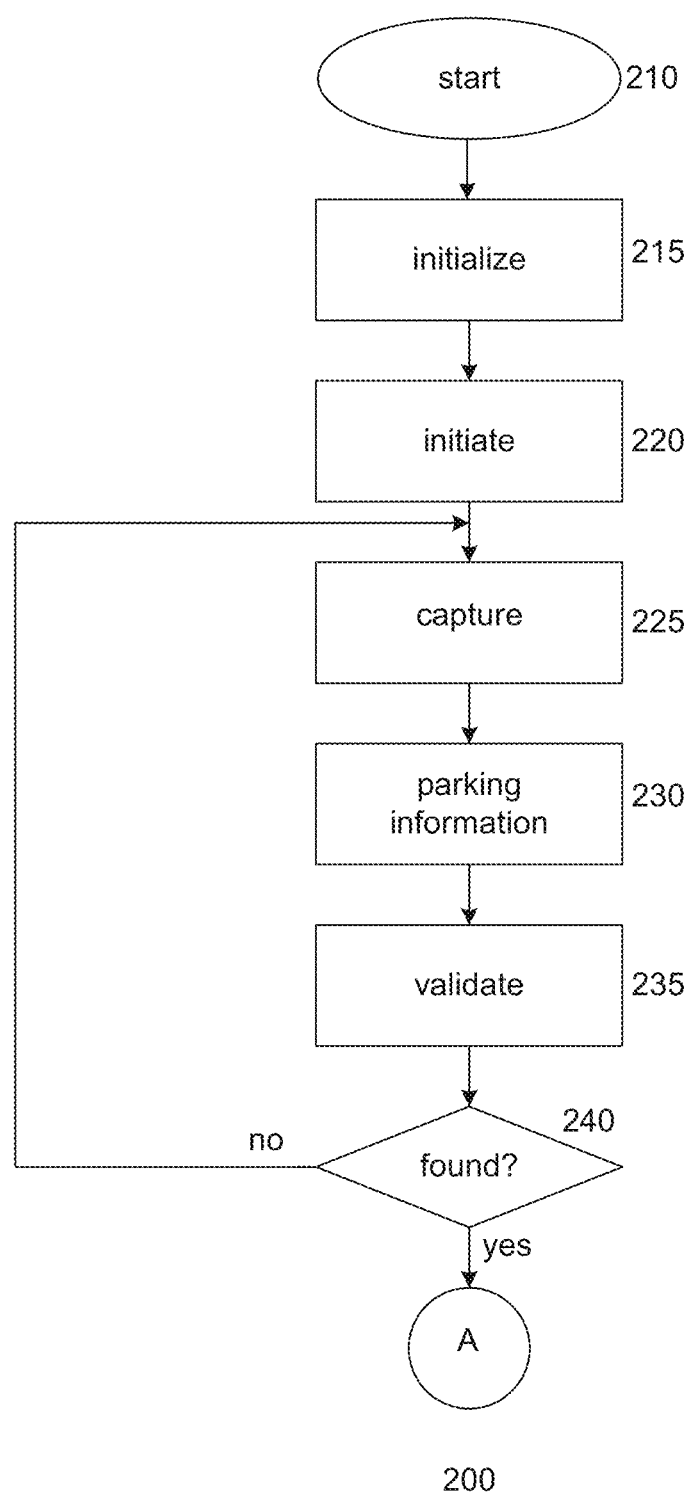
FIGS. 2a-b show a general process flow for autonomous parking.
Figure 2B:
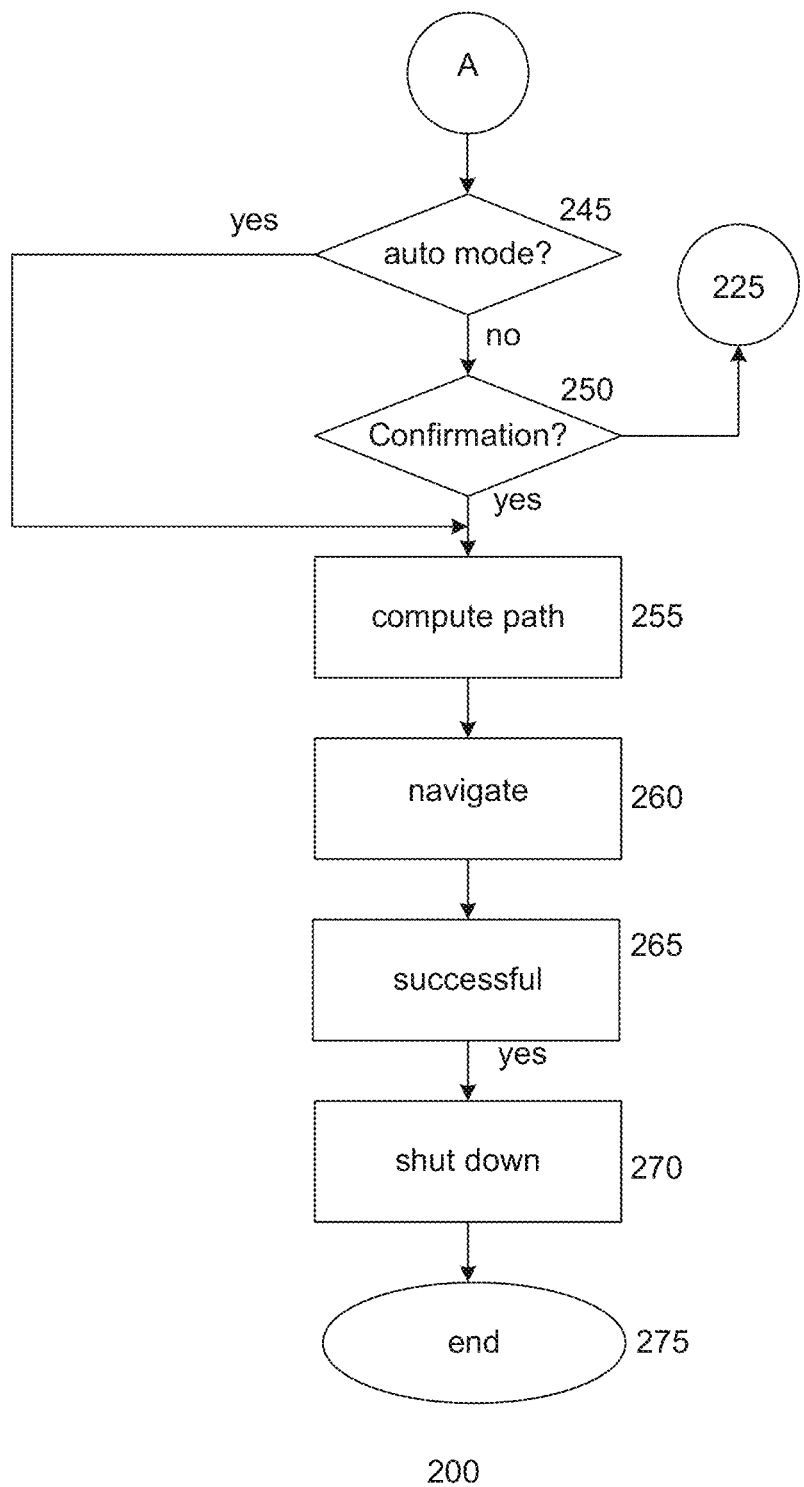

FIGS. 2a-b show a simplified process flow 200 for auto parking a vehicle using the autonomous parking system. The autonomous parking system can be operated when the vehicle is in autonomous driving mode or not. For example, the vehicle may be autonomously driven without driver aid or driven by the driver manually. The process starts at 210. For example, auto parking mode is triggered. In auto parking mode, the vehicle, for example, may be in the parking area.

At 215, the autonomous parking system is initialized. For example, the various subsystems and modules are initialized for auto parking operation, such as the camera units and software components. At 220, the auto parking search mode is initiated. This causes the car to be driven in autonomous mode in search of a parking slot. For example, the vehicle controller module may cause the vehicle to drive at a slow speed, such as at about 10 km/hr. In addition, the path planner module may plan a route for the car to proceed in search of a parking slot. For example, the path planner routes the vehicle to available slots based on current map information.

At 225, the image capture module captures images from the sides of the vehicle as it is traveling and sends the captured images as a camera stream to the processor module for processing. The processor module processes the camera stream from the camera units at 230. For example, the processor module processes two successive image frames of the camera stream using HGMS to detect an unoccupied parking slot. For example, apparent motion (AM) analysis is performed on two successive or sequential image frames to detect an unoccupied parking slot. This includes, in one embodiment, motion analysis to detect a parking slot and its occupancy status. In the event the parking slot is unoccupied, details of the unoccupied parking slot are determined. Details of the parking slot may include the dimensions and position of the parking slot with respect to the current vehicle position as well as parking slot orientation.

The processor module validates the unoccupied parking slot at 235. For example, the processor module determines if the vehicle fits into the unoccupied parking slot based on vehicle dimensions received from the vehicle information module. In addition, the processor module determines how to best park the vehicle, such as perpendicularly, diagonally, or parallelly. For example, information is provided for use in path planning by the path planner module.

If the parking slot is not validated at 240, the process returns to 225. For example, the process returns to 225 if the parking slot is not suitable for the vehicle, such as the dimensions of the vehicle is larger than the dimensions of the parking slot. On the other hand, if the parking slot is validated, the process continues to 245.

At 245, the process determines if the vehicle is in autonomous vehicle (AV) mode or not. For example, the path planner module determines if the vehicle is in AV mode or not. If the vehicle is in AV mode, the process continues to 255. If the vehicle is not in AV mode, the system queries the user for confirmation at 250 to park in the validated parking slot. For example, the path planner module queries the user. If the user confirms parking in the validated parking slot, the process continues to 255. If not, the process returns to 225.

At 255, the path to park the car in the validated parking slot is computed. For example, the path planner module computes the path for parking the vehicle into the validated parking slot based on information of the validated parking slot. In one embodiment, the optimal trajectory for auto parking, from the vehicle location to the parking slot and orientation of the parking slot, is computed.

The vehicle, at 260, is navigated into the parking slot. The vehicle controller module, for example, provides the control signals to perform auto parking at the desired speed (longitudinal) control and steering (lateral) control based on the computed path. After parking is completed, the driver is notified by the autonomous parking system of successfully parking the vehicle at 265. The autonomous parking system shuts down at 270, for example, releasing the auto parking resources. The auto parking mode terminates at 275.

HGMS involves motion analysis of successive images when the vehicle is moving. For example, apparent motion is computed using dense or semi-dense optical flow between two successive image frames of a camera stream. For example, apparent motion analyzes the movement or flow of corresponding pixels between two successive image frames. Due to the perspectivity of the camera, the same amount of motion in the real world results in a different magnitude of pixel motion at different rows of the image. This is based on the motion parallax principle.

In one embodiment, calibration is performed to determine a perspectivity rectified factor for each row to determine the perspectivity relationship of each row of the image to the real world and saved as perspectivity ratio map (PR). For example, PR(y) indicates the perspectivity relation at a given row ($y^{th}$ row) on an image with h rows, where y is from 0 to h−1. The perspectivity ratio map indicates the scaling effect of perspectivity on a unit length in the world system at each row of the image. PR(y) helps to rectify the perspectivity across different rows of the image.

The calibration generates a homography matrix h.Mat, which may be a 3 by 3 matrix containing homography transformation between camera and real world. For example, h.Mat represents the transformation between two planes using rotation and translation relationship. The homography matrix h.Mat facilitates image coordinate to world coordinate mapping and vice-versa. To improve performance, lookup tables are generated for image-to-world coordinate mapping and world-to-image coordinate mapping.

Figure 3:
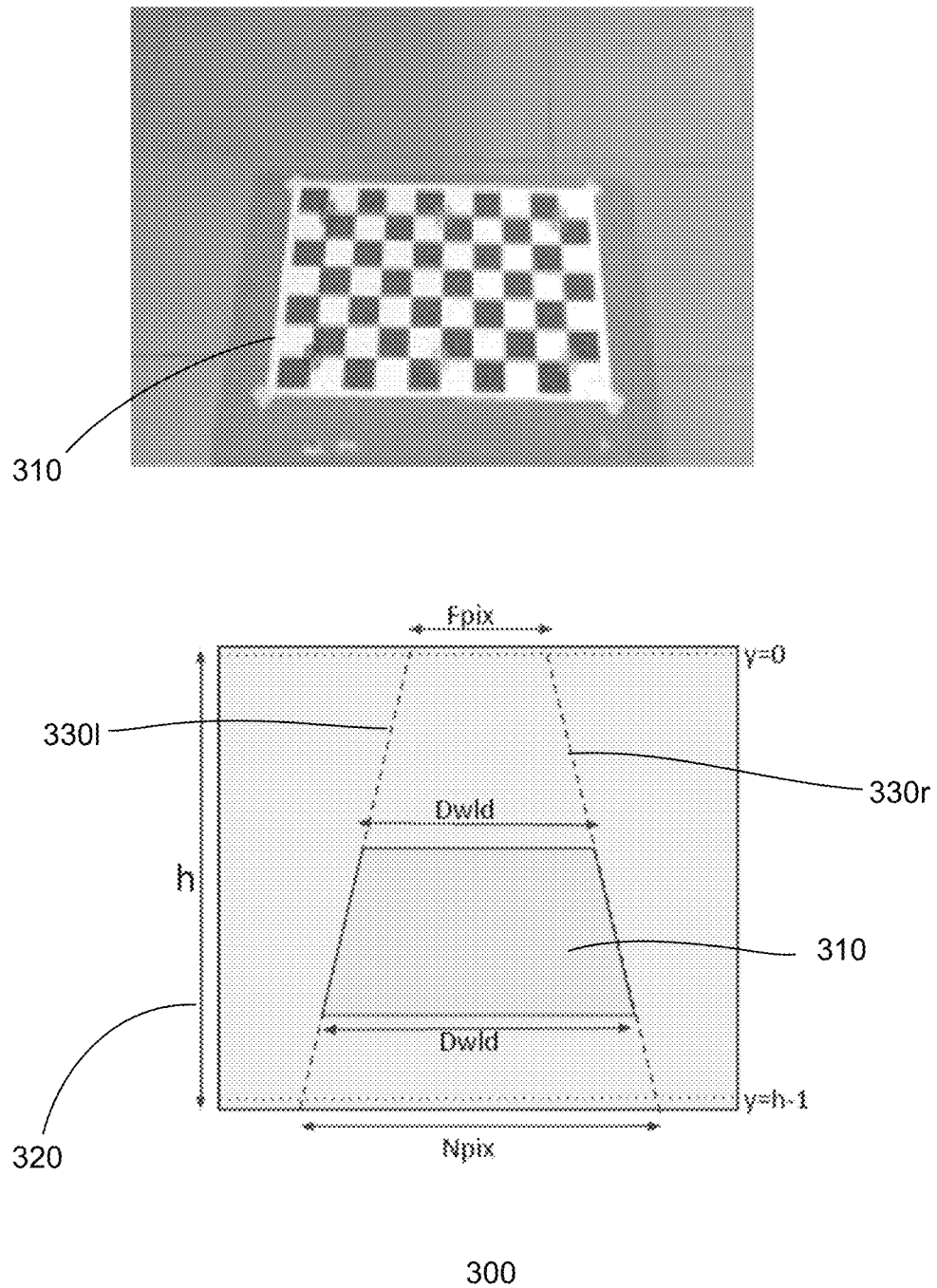
FIG. 3 shows an embodiment of a calibration process for camera units.

FIG. 3 shows an embodiment of a calibration process 300. As shown, a calibration pattern 310 of a known dimension is placed on the ground at a known distance from a camera unit. Ground points with known distances are mapped to their corresponding image points. This helps to generate a homographic transformation. Exemplary range of ground or reference points are within 5 m longitudinally and 2 m laterally. For example, the calibration pattern is a rectangular-shaped pattern. The known width of the pattern is Dwld. Non-rectangular shaped patterns may also be useful.

An image 320 of the calibration pattern 310 is generated from the camera unit. The image, for example, includes h×t pixels. For example, the image has h rows of pixels and t columns of pixels. The top of the image may be the far side of the image with respect to the vehicle and the bottom of the image may be the near side of the image with respect to the vehicle. The top of the image may correspond to the first row of pixels (y=0) and the bottom of the image may correspond to the last row of pixels (y=h−1). Other configurations may also be useful.

The sides of the calibration pattern in the image are extended from the top to the bottom of the image. For example, left and right side lines 330*l* and 330*r* extend from the sides of the calibration pattern to the top and bottom of the image. As can be seen, Dwld on the far side is narrower than Dwld on the near side due to the perspectivity of the camera. As such, the width or distance between the two side lines at the top or far side of the image, which is referred to as Fpix is narrower or smaller than the width or distance between the two side lines at the bottom or near side of the image, which is referred to as Npix. The Perspectivity Ratio Map (PR) for each row is calculated based on the row scale factor (RowScaleFact) as defined below:

$$\text{RowScaleFact} = (N\text{pix} - F\text{pix})/h - 1 \qquad \text{Equation (1).}$$

The PR for the $y^{th}$ row between rows 0 to h−1 is calculated as follows:

$$PR(y)=Npix/(Fpix+y*RowScaleFact) \quad \text{Equation (2)}.$$

The perspectivity rectified factor for each row is calculated and forms the Perspectivity Ratio Map (PR).

The calibration and generation of the homography matrix h.Mat are performed for both camera units. For example, the right and left camera units of the image capture module are calibrated and respective homography matrices are generated.

Figure 4:
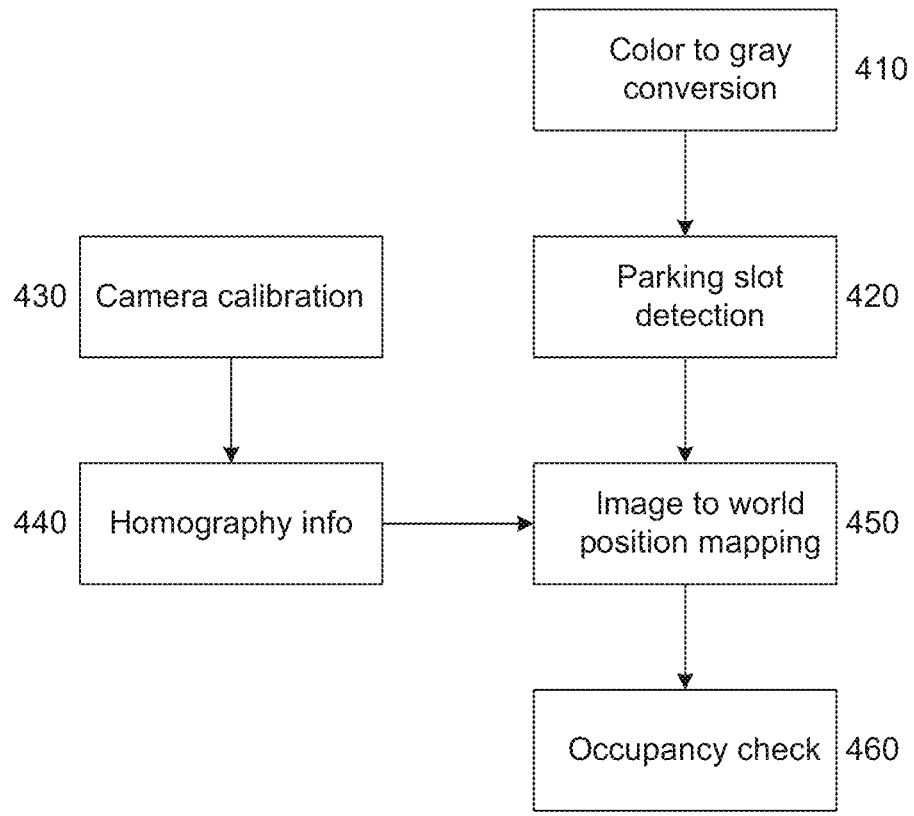
FIG. 4 shows a simplified general process flow for identifying a parking slot.

FIG. 4 shows a simplified general process flow 400 of an embodiment for identifying a parking slot. As discussed, identifying a parking slot involves motion analysis on 2 successive image frames of a camera stream. The image frames, prior to the analysis, are converted to grayscale at 410. For example, color images are converted to grayscale prior to motion analysis for detecting a parking slot at 420. The motion analysis, in one embodiment, is performed to determine apparent motion based on dense optical flow between two successive image frames of a camera stream. For example, apparent motion analyzes the movement or flow of corresponding pixels between two successive image frames. The parking slot detection is based on parking slot lines.

As discussed, the camera units are calibrated at 430 to set up the system and homography information is generated at 440 from the calibration. The homography info is provided to provide image-to-world mapping for the motion analysis at 450. Once a parking slot is identified, the process performs the occupancy status check at 460.

Figure 5A:
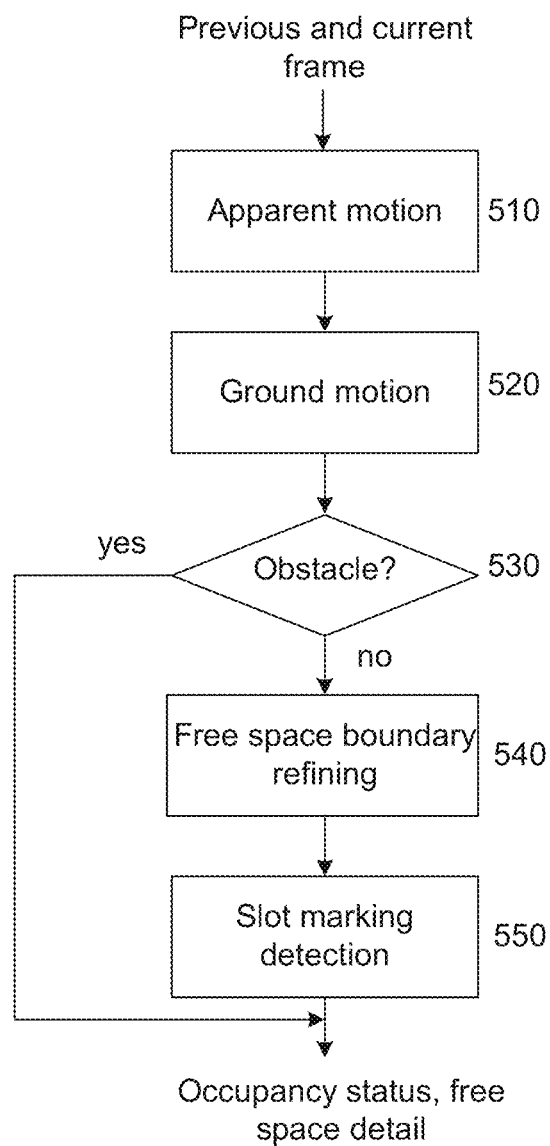
FIG. 5a shows a process flow for identifying and determining the status of a parking slot.

FIG. 5a shows a simplified process flow 500 for identifying a parking slot or space. Identifying a parking slot involves analyzing 2 consecutive image frames captured by the image capture module. The images, if in color, are converted to grayscale. Apparent motion analysis is performed on the 2 consecutive image frames at 510. Apparent motion analyzes the movement of corresponding pixels between the 2 consecutive or successive image frames taken from the vehicle when moving during auto parking mode. Apparent motion is computed using dense optical flow between two successive image frames.

At 520, ground motion estimation is computed based on the results of the apparent motion. For example, ground motion is used to segment the apparent motion into ground and obstacles. After ground motion estimation is computed, the process checks to determine if obstacles are present or not at 530. If no obstacles are identified, then a free parking slot is found and process proceeds to 540. If an obstacle is identified, then the parking slot is not available or free and analysis continues. For example, the current image frame is compared to the next image frame to analyze. For example, the current image frame becomes the previous image frame and the next image frame becomes the current image frame.

At 540, the boundary of the free parking slot is refined. For example, local ground motion correction is performed to refine ground motion. This helps in handling ground surface inclinations and minor camera view changes to extract accurate object boundaries. Parking slot marking detection is performed at 550. The occupancy status and details of the free parking slot are provided, for example, for validation and subsequent processes.

Figure 5B:
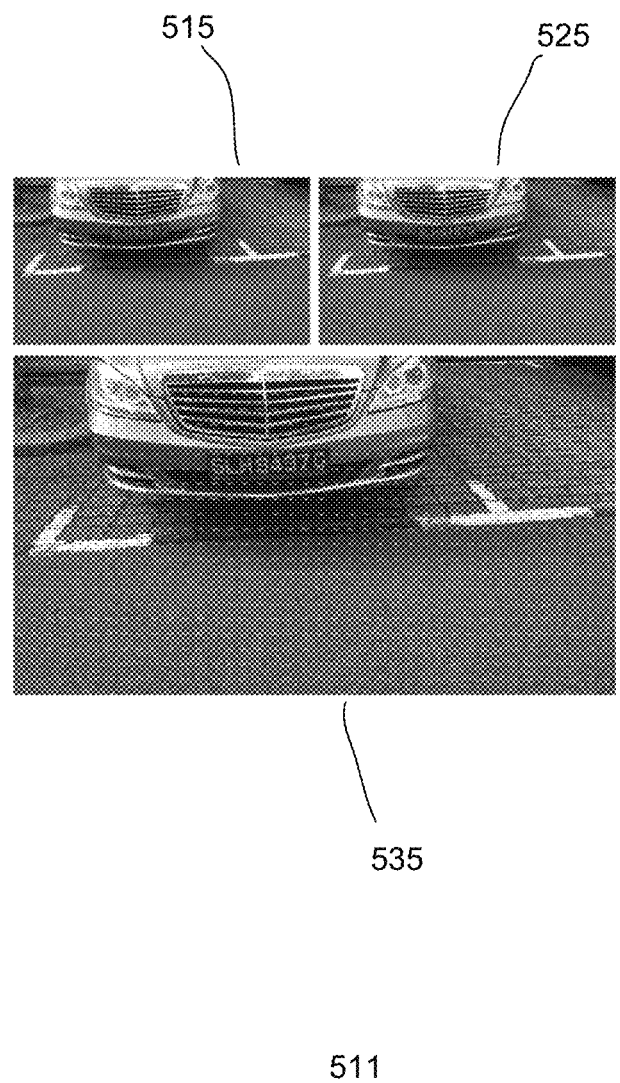
FIGS. 5b-c show examples of a motion analysis.

FIG. 5b shows an example of a motion flow analysis 511. As shown, 2 successive image frames 515 and 525 of an occupied parking slot in grayscale are provided for motion analysis. The motion analysis employs dense optical flow to determine the apparent motion flow 535 of each pixel of the two consecutive image frames.

Figure 5C:
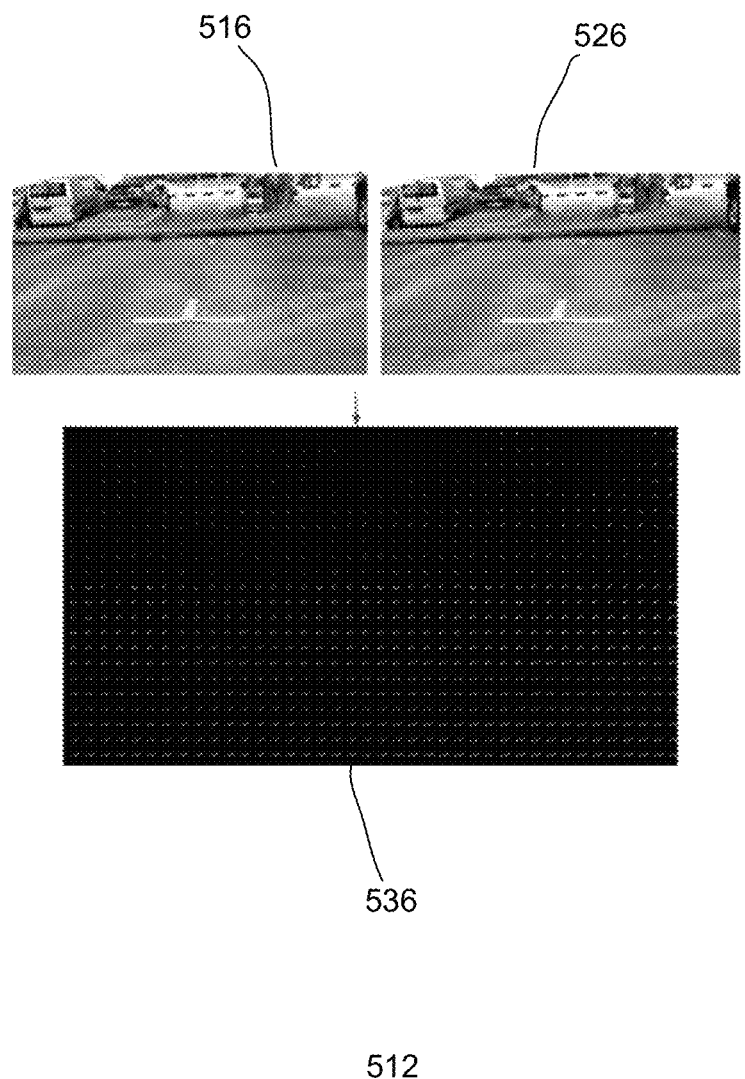

FIG. 5c shows another example of a motion flow analysis 512. As shown, 2 successive image frames 516 and 526 of an unoccupied parking slot in grayscale are provided for motion analysis. The motion analysis employs dense optical flow to determine the apparent motion flow 536 of each pixel of the two consecutive image frames.

Figure 6A:
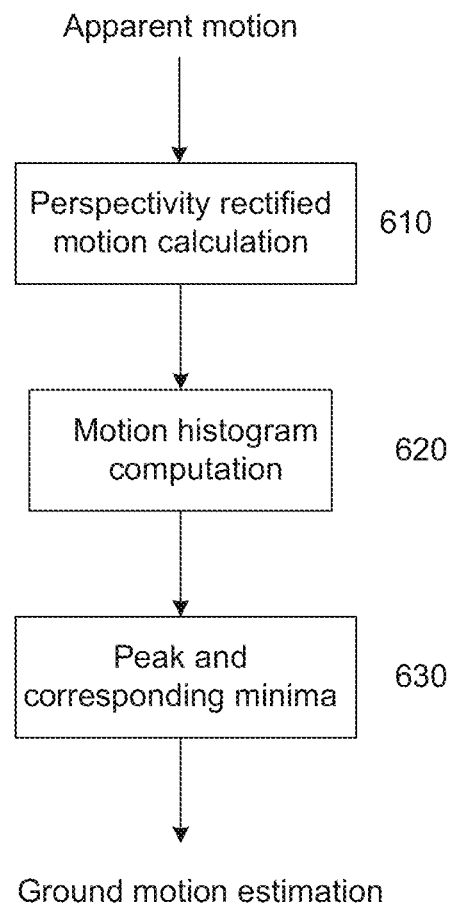
FIG. 6a shows a process flow for determining ground motion estimation based on apparent motion.

FIG. 6a shows a process flow 600 for determining ground motion estimation based on apparent motion. As discussed, apparent motion is the movement of corresponding pixels between two image frames of a moving camera. Apparent motion is computed using dense optical flow between two successive image frames. Apparent motion is used to determine perspectivity rectified motion at 610. Perspective rectified motion (PRM) can be computed by applying the perspectivity correction or perspectivity rectified factor on the apparent pixel motion (AM). The perspectivity rectified factor is determined based on camera calibration and stored in the homography matrix h.Mat. The PRM of a specific pixel at the location x, y, or PRM(x,y) can be calculated as follows:

$$PRM(x,y)=AM(x,y)*PR(y) \quad \text{Equation (3),}$$

where

AM(x,y) is the apparent motion of a pixel at location x, y, and PR(y) is the perspectivity rectified factor at row y. AM is calculated for all pixels of the image.

At 620, a motion histogram is computed. The motion histogram is a plot of PRMs of all pixels of the image. The range of the histogram includes positive (+ve) and negative (−ye) motions. The histogram is smoothened to handle local minima. The peak of the histogram and its corresponding minima, for example, before and after the peak, is determined at 630. This indicates the PRM range exhibited by a majority of the pixels. This corresponds to ground motion.

Figure 6B:
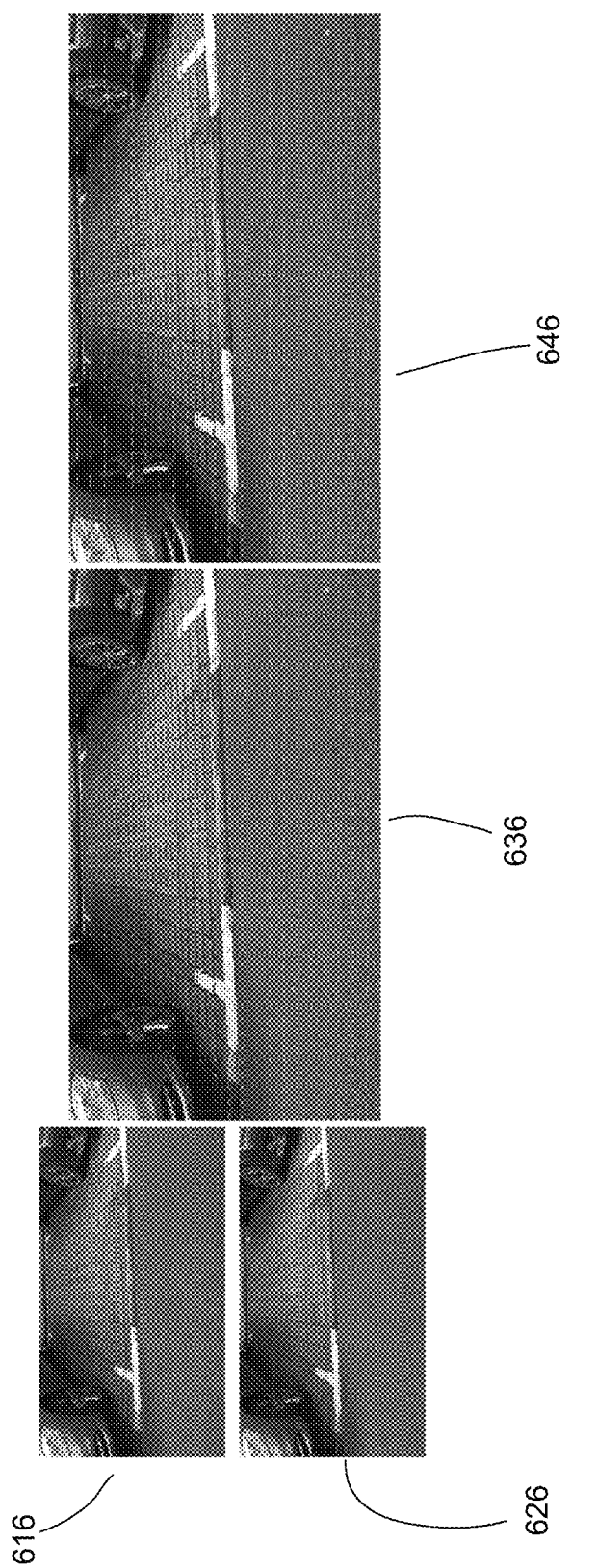
FIG. 6b depicts an example of perspectivity rectified motion analysis.

FIG. 6b depicts an example of perspectivity rectified motion analysis 606. As shown, previous and current image frames 616 and 626 are analyzed. For example, the grayscale images of the previous and current image frames are analyzed. The analysis includes motion analysis to determine apparent motion 636 of corresponding pixels from the previous and current image frames. Based on apparent motion, perspectivity rectified motion flow 646 of the pixels are calculated by the perspectivity rectified factor to the apparent pixel motion (AM) for each corresponding pixel pair of the previous and current image frames.

Figure 6C:
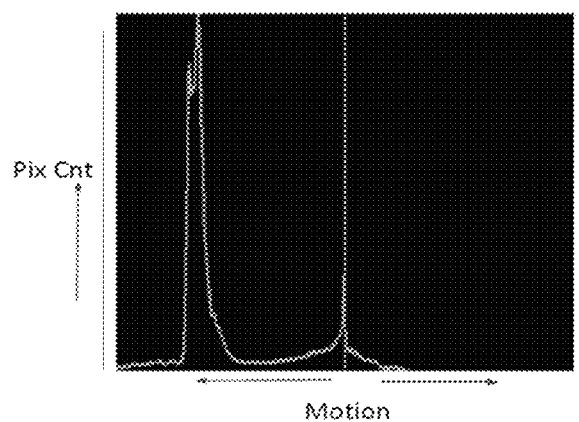
FIG. 6c shows an exemplary histogram from calculated perspectivity rectified motion.

FIG. 6c shows an example of a motion histogram 615. The motion histogram is calculated from perspectivity rectified motion, as described in FIG. 6. For example, the histogram indicates the magnitude of motion in the image at different pixels. A majority of ground zone is seen in the image along with any potential obstacles. The histogram peak represents the perspectivity rectified motion magnitude exhibited by the majority of pixels, typically corresponding to ground.

Figure 6D:
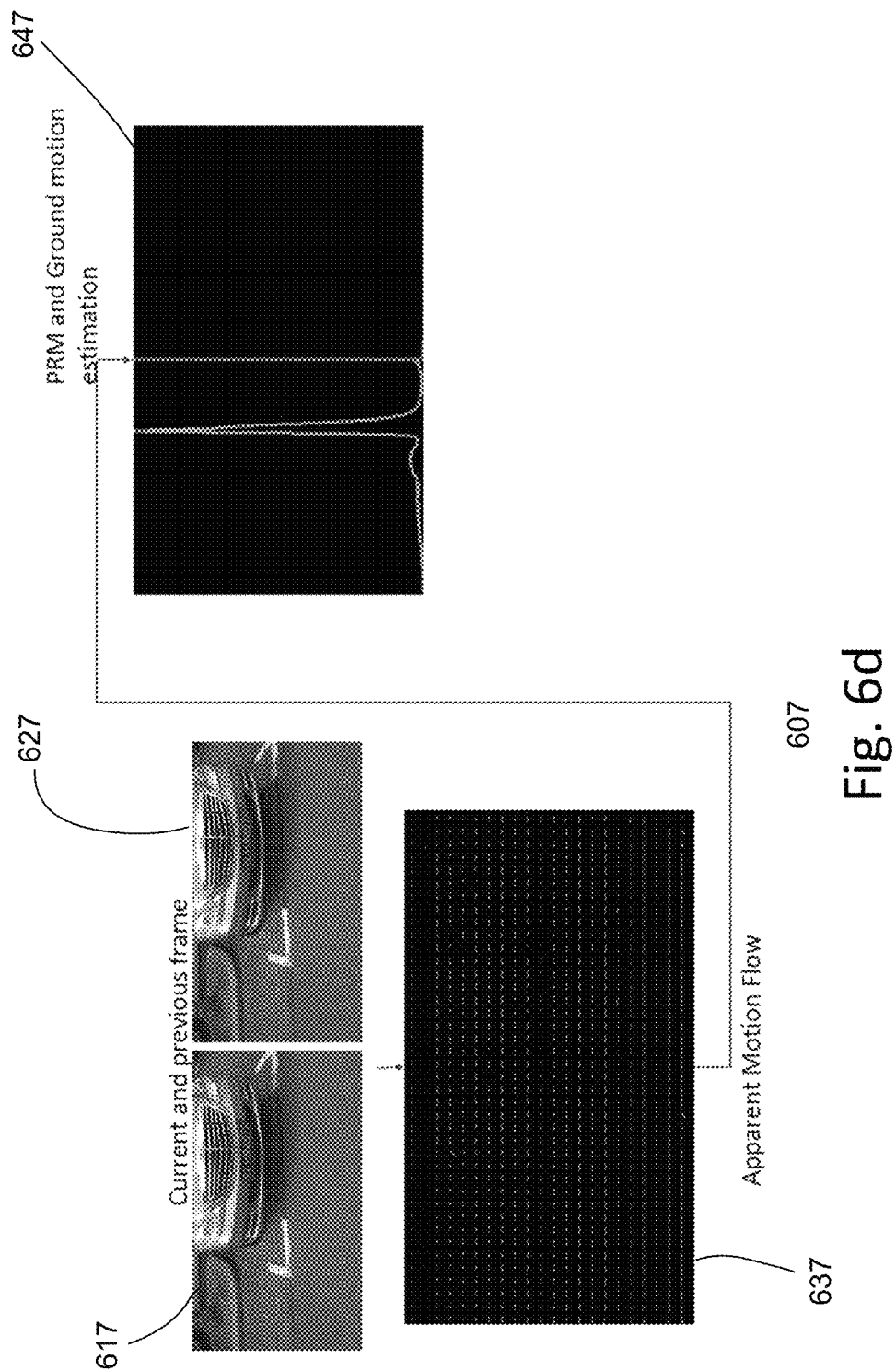
FIGS. 6d-e depict examples of ground motion estimation.
Figure 6E:
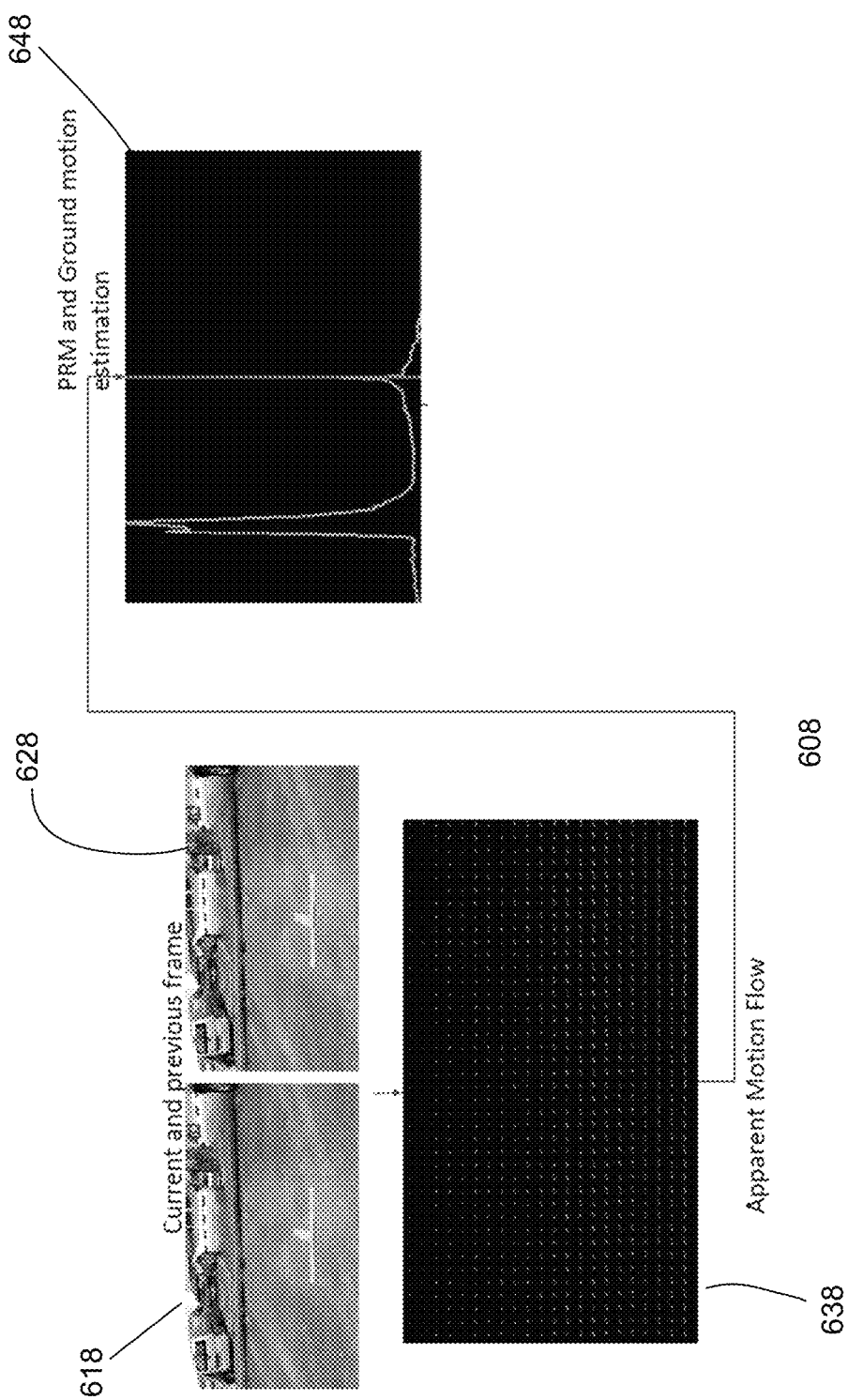

FIGS. 6d-e depict examples of ground motion estimation. Referring to FIG. 6d, the ground motion estimation 607 is of previous and current image frames 617 and 627 of an occupied parking slot. The analysis includes motion analysis to determine apparent motion 637 of corresponding pixels from the previous and current image frames. Based on apparent motion, perspectivity rectified motion flow of the pixels are calculated by the perspectivity rectified factor to the apparent pixel motion (AM) for each corresponding pixel pair of the previous and current image frames. A motion histogram 647 is calculated from perspectivity rectified motion flow.

As for FIG. 6e, the ground motion estimation 608 is of previous and current image frames 618 and 628 of an unoccupied parking slot. The analysis includes motion analysis to determine apparent motion 638 of corresponding pixels from the previous and current image frames. Based on apparent motion, perspectivity rectified motion flow of the pixels are calculated by the perspectivity rectified factor to the apparent pixel motion (AM) for each corresponding pixel pair of the previous and current image frames. A motion histogram 648 is calculated from perspectivity rectified motion flow.

Figure 7A:
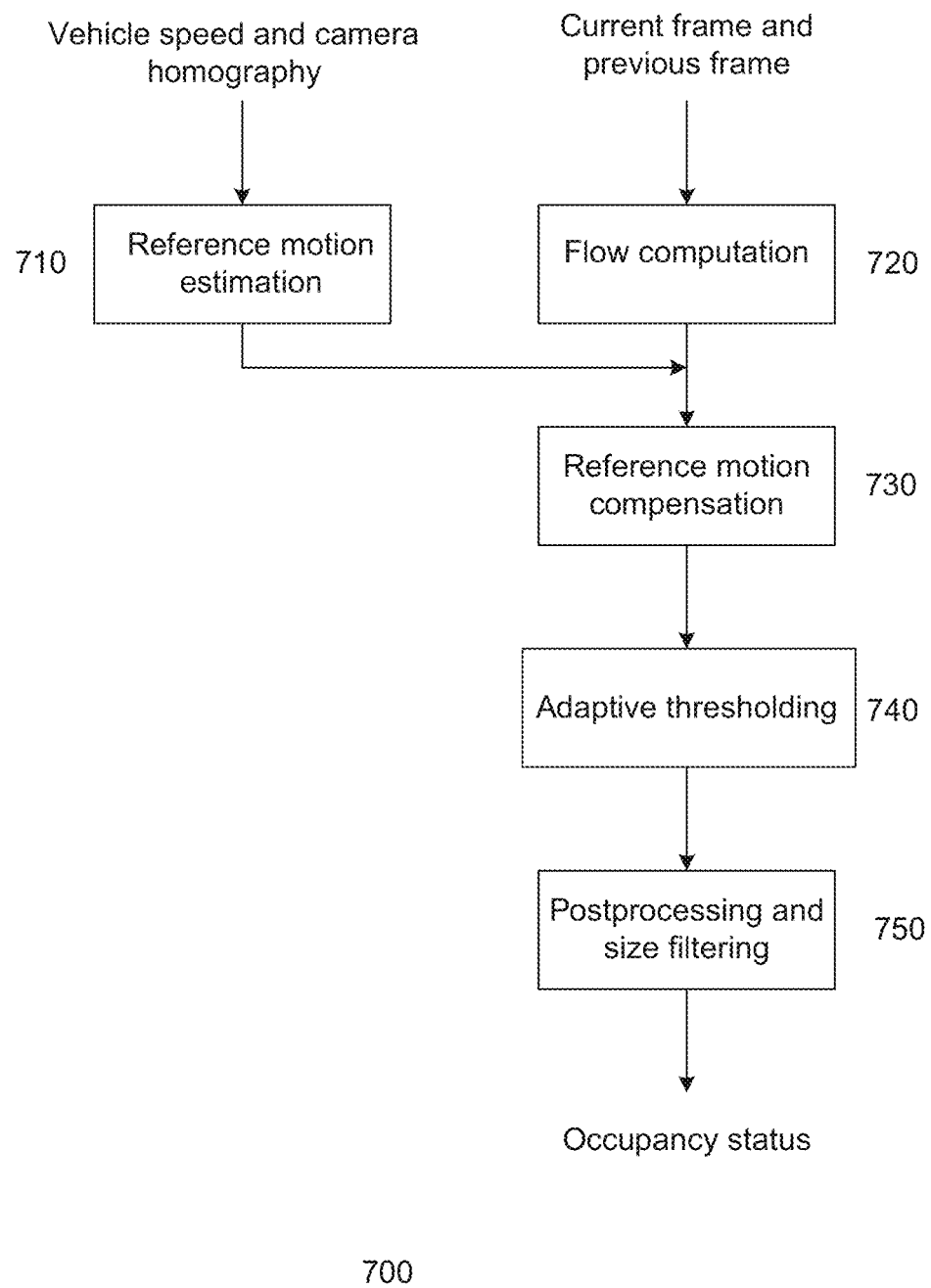
FIG. 7a shows an embodiment of an occupancy check flow using HGMS.

FIG. 7a shows an embodiment of a process flow 700 for occupancy check using HGMS. For example, the occupancy check determines if the parking slot has an obstacle present or not. To extract obstacles, reference motion estimation is determined at 710. In one embodiment, homography guided reference motion estimation is employed.

A reference ground plane motion (RefGndMap) is calculated. The RefGndMap can be estimated by various techniques. For example, RefGndMap can be estimated from the peak motion computed in the ground motion estimation process (e.g., seed row is h−1), the vehicle speed and calculating the equivalent pixel motion in the seed row (h−1) of the image, the motion computed at a seed row of the parking slot marking (a seed row is selected based on the parking slot position in the image), or a combination thereof. In one embodiment, ground motion estimation is calculated from the peak motion computed in the ground motion estimation process (e.g., seed row is h−1) and validated by the vehicle speed and calculating the equivalent pixel motion in the seed row (h−1) of the image and calculating the motion at a seed row of the parking slot marking (a seed row is selected based on the parking slot position in the image). From the reference motion calculated at one of the image rows, the RefGndMap for all image rows is calculated using PR. The reference ground plane is used to, for example, refine obstacle boundary. The reference ground plane motion represents the motion flow of the ground plane for the current pair of image frames (e.g., the previous image frame and the current image frame).

In one embodiment, RefGndMap is computed based on current vehicle speed and camera homography, such as h.Mat. For example, the displacement between the current and previous image frames in the world coordinate system is computed. Then, the equivalent pixel displacement at each image row is computed based on the homography matrix h.Mat and the reference perspectivity ratio map PR calculated as part of the calibration process.

In some cases, the speed of the vehicle may not be available. In such cases, dense motion may be used. This includes selecting a seed row. A seed row is a row indicating the ground plane. For example, a slot marking pixel value may be used as a reference to select a seed row. The mean motion at the seed row (RefFlow$_{SeedRow}$) is computed according to equation 4a below:

$$RefFlow_{SeedRow} = 1/(ImgWidth) * \sum_{i=0}^{ImgWidth-1} flow(i). \quad \text{Equation (4a)}$$

Based on RefFlow$_{SeedRow}$ and PR, the motion at each image row j is computed according to equation 4b below:

$$RefGndMap_j = RefFlow_{SeedRow} * PR_j / PR_{SeedRow} \quad \text{Equation (4b).}$$

Equation (4b) can be applied to any of the techniques used to determine RefGndMap.

In another embodiment, since ground motion is estimated globally, RefGndMap can be computed based on pixels corresponding to the ground from the global histogram. For each row, pixels corresponding to the ground are extracted and a row motion histogram (row_motion_histogram) is created. For example, a row_motion_histogram is created for each row. Peak motion of the row_motion_histogram is computed and used as the ground reference motion for the corresponding row.

At 720, flow computation in the parking slot region is calculated based on the current and previous image frames. For example, flow computation is achieved using dense optical flow to generate the dense flow map. For example, apparent motion flow is calculated. The apparent motion flow may be calculated previously with respect to determining perspectivity rectified motion.

At 730, reference motion compensation is performed. Reference motion, in one embodiment, is compensated by subtracting RefGndMap from the dense flow map. Reference motion compensation results in the obstacle motion (ObstFlow) as shown in equation 5a below:

$$ObstFlow_{i,j} = flow_{i,j} - RefGndMap_j \quad \text{Equation (5a),}$$

where
ObstFlow$_{i,j}$ is the obstacle flow at pixel location i, j,
flow$_{i,j}$ is the dense flow of the pixel at location i, j, and
RefGndMap$_j$ is the RefGndMap at row j.

To handle any noise in the flow computation, homography guided adaptive threshold (AdptThdMap$_j$) is applied at 740. AdptThdMap$_j$ is defined according to equation 5b below:

$$AdptThdMap_j = Threshold * PR_j \quad \text{Equation (5b),}$$

where
AdptThdMap is the AdptThdMap at row j,
PR$_j$ is the perspectivity rectified factor at row j, and
Threshold is the defined threshold As such, AdptThdMap$_j$ is defined with perspectivity in view and gradually increases with row number.

AdptThdMap$_j$ produces binary masks of potential obstacle regions, as shown by equation 5c below:

$$ObstacleMap_{i,j} = \begin{cases} 1, & \text{if } ObstFlow_{i,j} \geq AdptThdMap_j \\ 0, & \text{otherwise} \end{cases} \quad \text{Equation (5c)}$$

For example, when ObstacleMap$_{i,j}$ is equal to 1, it corresponds to a non-ground pixel and when ObstacleMap$_{i,j}$ is equal to 0, it corresponds to a ground pixel. After grouping and analyzing the neighboring homogenous pixels, masks are created. White pixel mask represents object zone and black represents ground zone.

The binary masks are further post-processed at 750 with binary morphology closing operation to eliminate breaks due to smooth texture of any obstacle. A filter may be applied based on the pixel area to suppress noise blobs of small sizes and retaining the binary masks of the obstacles in the selected parking region in the current frame. For example, binary masks with value 1 represent the pixels which have motion higher than the reference ground motion. Such pixels represent the obstacles. Based on the size of the mask, we can estimate the size of an obstacle can be estimated.

After postprocessing and size filtering, the process may proceed to determine occupancy status.

Figure 7B:
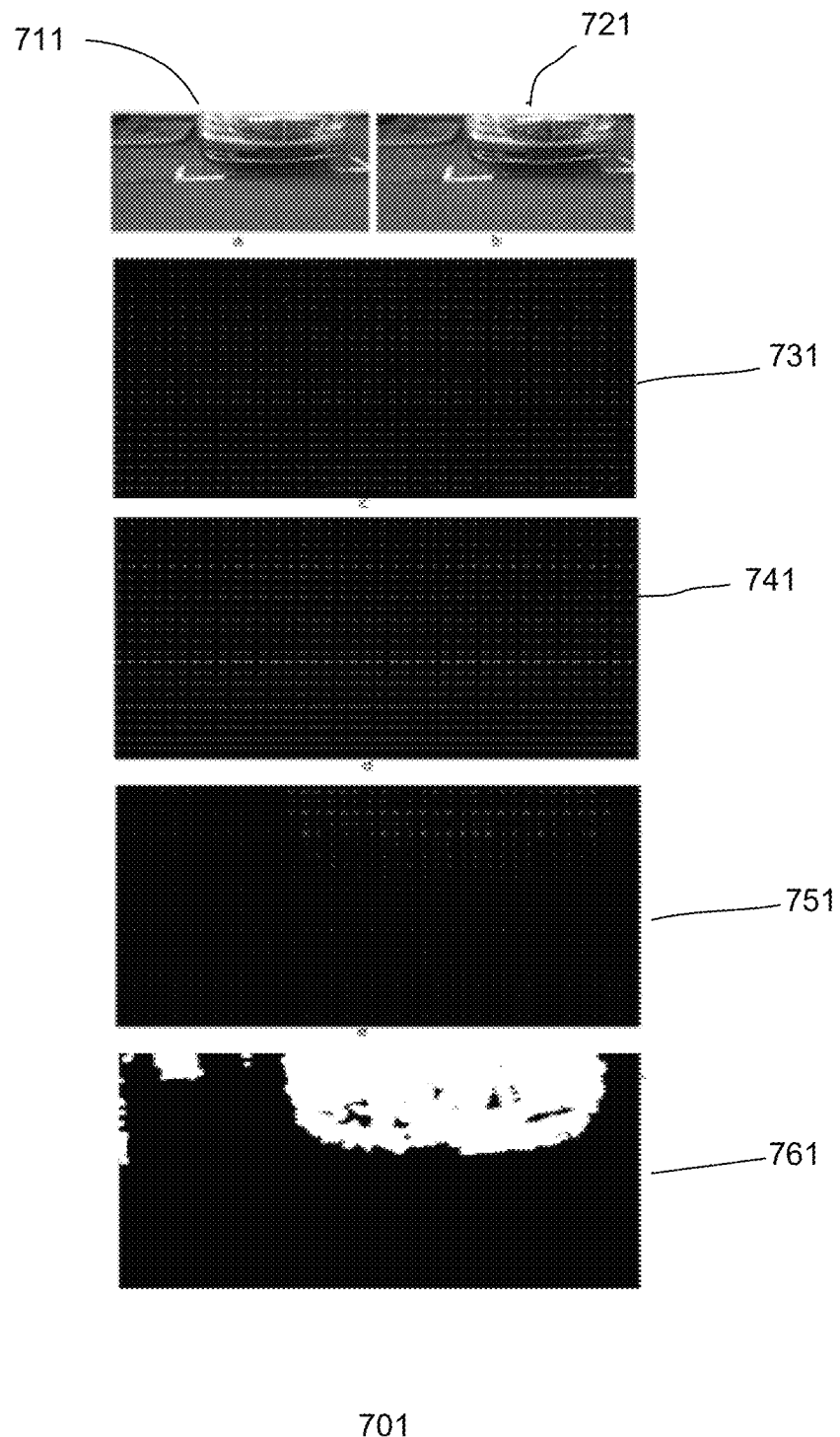
FIG. 7b depicts another embodiment of occupancy check flow using HGMS.

FIG. 7b depicts a sequence of occupancy check 701 based on HGMS. As shown, a current image frame 711 and a previous image frame 721 are captured by the image capture module and processed. For example, the image frames are grayscale images. Dense motion analysis is performed to produce a motion flow 731. For example, dense optical flow is performed to produce the motion flow. Homography guided reference motion analysis is performed to produce the RefGndMap 741. Reference compensation is performed on the dense optical flow to produce obstacle flow 751. Adaptive thresholding is performed to produce obstacle masks in the masked obstacle flow 761.

In one embodiment, the autonomous parking system detects parking slots or spaces based on parking slot markings. Detecting parking slots based on other features may also be useful. For example, if no parking slot markings are present, the ground zone from the occupancy check can be analyzed for free space dimension and generate the parking space suitability. Parking slots are generally represented by a set of lines or parking slot markings. The color of the parking slot markings may be red, yellow, or white. Other colors may also be useful. The parking slot markings are used to indicate the length, width, and orientation of the parking slot allocated for each vehicle.

Figure 8:
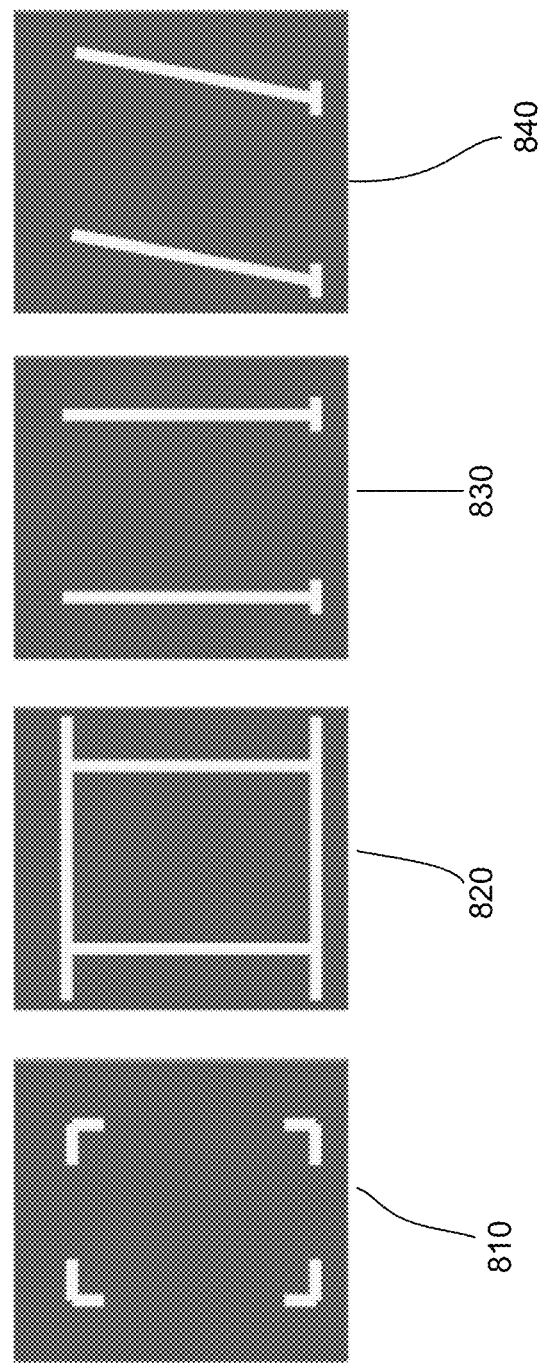
FIG. 8 shows exemplary parking slot markings.

FIG. 8 shows exemplary types of parking slot markings. A parking slot 810 may include L-shaped markings located at corners of the parking slot. The L-shaped markings are configured to define the parking slot. Alternatively, a parking slot 820 may be defined by a set of lines configured as a rectangle defining the parking slot. In other cases, the parking slot may be defined by parallel lines along the length of the parking slot, such as shown by parking slots 830 and 840. The first ends of the parallel lines may include perpendicular lines. As shown, the perpendicular lines may be configured to form T-shaped first ends. The perpendicular line may alternatively be configured to form L-shaped first ends. Other configurations of first ends may also be useful. Parallel lines, for example, are used to define a row of adjacent parking slots. The parallel lines may be perpendicular to the row direction, as shown by parking slot 830. Alternatively, as shown by parking slot 840, the parallel lines are disposed at an angle to the row direction. What is shown in FIG. 8 are only some examples of commonly employed parking slot markings. Other configurations of parking slot markings may also be applicable.

Since parking slot markings have similar structural characteristics as road lane markings, a gradient is employed to locate the parking slot markings and to validate the structural characteristics of the parking slot markings.

Figure 9A:
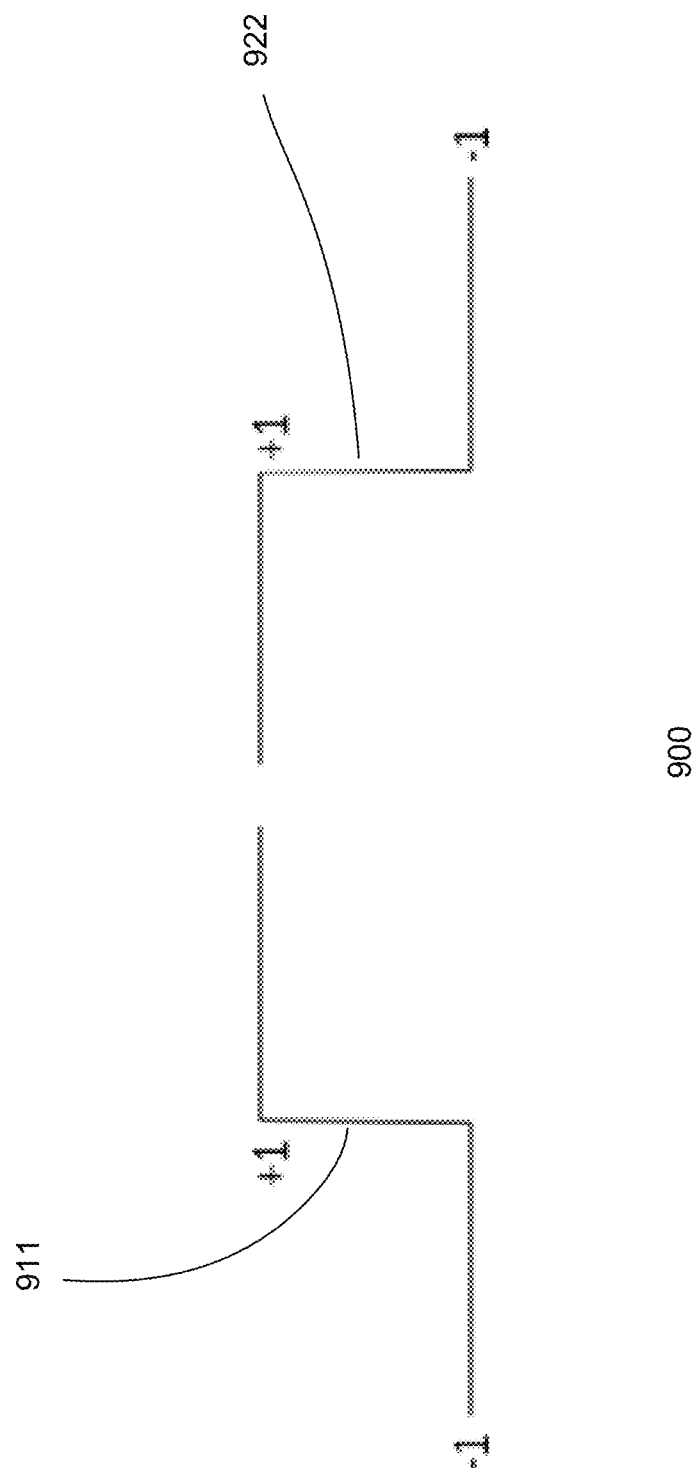
FIG. 9a shows an embodiment of a pair of 1-D image filters.

In one embodiment, a pair of 1-D image filters 900 are used, as shown in FIG. 9a. The filters 911 and 922 are employed to compute the rising and trailing edges of a grayscale image. For example, based on equation 6 below, each of the filters f is applied to the input gray image I to determine the candidate rising and trailing edge pixels:

$$foI(x) = \sum_{i=-N}^{N} f(i)I(x+i),$$  Equation (6)

where

N is the length of the 1-D filter with exemplary range of about 1 to 3, and x is equal to each pixel on the input image.

As an example, a valid parking slot marking may be a line mark having a combination of the rising and trailing edge pixels separated by a distance similar to the line mark thickness. The rising and trailing edge pixels are validated based on the condition that the rising pixel is followed by a falling edge pixel with a distance less than a threshold value. The center pixel of the line mark is computed by averaging each rising and trailing pixel position. This produces a binary image, where the bright pixels are processed to compute the approximate line segments, which are used for further processing.

As shown, the filters are configured for detecting vertical lines. Configuring the filters to detect horizontal lines may also be useful. Since the filters are configured to handle lines with angles from −45° to 45°, V-H pairs are not constrained to 90°.

Figure 9B:
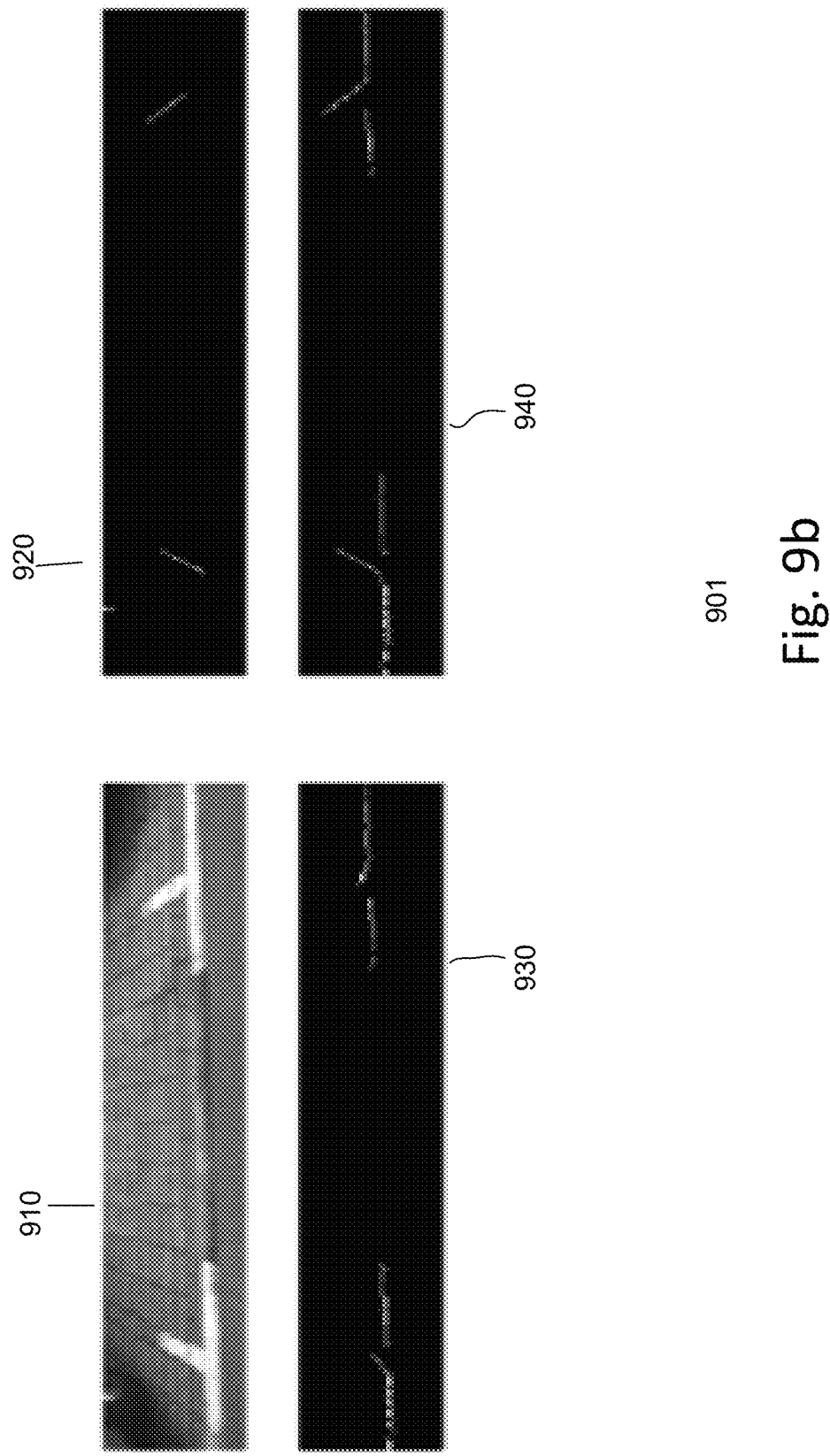
FIG. 9b shows a process flow of detecting parking slot marking using 1-D image filters.

FIG. 9b depicts a process 901 using the 1-D filters. A grayscale image 910 is provided for filtering. Image 920 depicts the effect of vertical lines after the filtering process using the 1D filters. For example, the edges of the vertical line marks are shown. Image 930 depicts the effect of the horizontal lines after the filtering process using the 1D filters. For example, the edges of the horizontal line marks are shown. As for image 940, it depicts the effect of the combination of vertical and horizontal line marks. For example, combined horizontal and vertical edges of the line marks are shown.

Figure 10A:
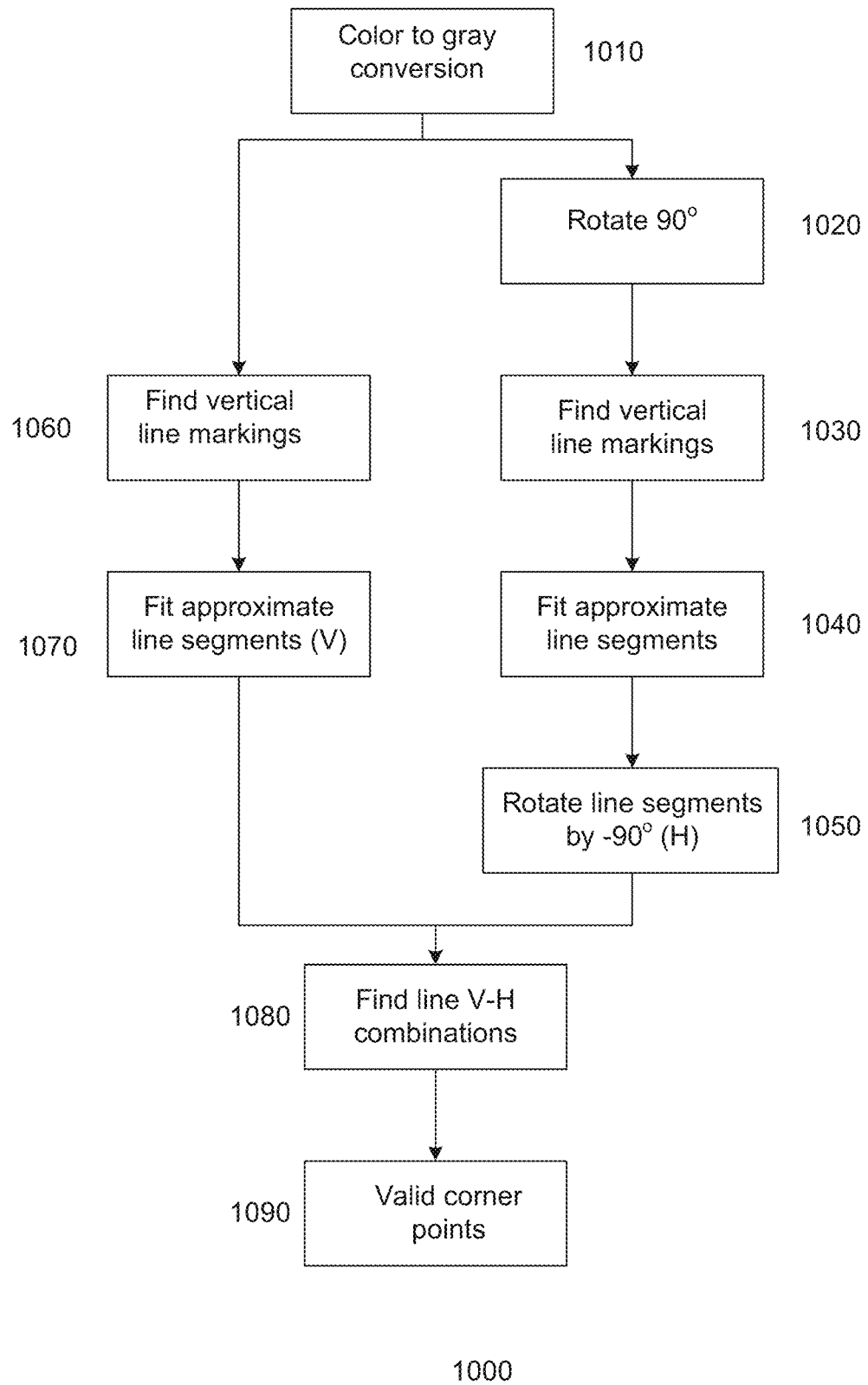
FIG. 10a depicts a process flow of parking slot marking detection.

FIG. 10a shows a process flow 1000 for detecting parking slot markings or line marks defining the parking slot. The process is employed to determine the correct pair of slot corners for the parking slot, which is then used to determine the dimensions and orientation of the unoccupied parking slot for subsequent validation. The process analyzes an image. For example, the current image frame of the camera stream is analyzed. At 1010, the image frame is converted to grayscale. In the case the image is black and white or has already been converted, 1010 can be skipped.

The parking slot detection is configured to detect horizontal and vertical line marks. In one embodiment, the 1D filters are configured for detecting vertical line marks. Configuring the 1D filters for horizontal line marks may also be useful.

To detect horizontal parking slot markings or line marks of the image, the image is rotated at 1020 by 90°. For example, the horizontal line marks become vertical line marks. The process analyzes the image for vertical line marks or segments at 1030. For example, the 1D filters are used to identify vertical line segments. The center pixels of the vertical line segments are calculated. The center pixels are used to compute approximate line segments at 1040. At 1050, the vertical line segments are rotated −90°, putting them back in their original position as horizontal line segments. The approximate line segments are mapped to world coordinates using homography information created during the calibration process. The process proceeds to 1080.

As for detecting vertical line marks, it is similar to detecting horizontal line marks, except that there is no need to rotate the image. For example, at 1060, the process finds vertical line marks and computes approximate line segments at 1070. The approximate line segments are mapped to world coordinates using homography information created during the calibration process. The process proceeds to 1080.

The vertical and horizontal line segments which are mapped to world coordinates, are checked for intersecting pairs of a vertical line and a horizontal line (V-H) at 1080. In one embodiment, V-H pairs are shortlisted. Shortlisted V-H pairs are those with the shortest distance between vertical and horizontal line segments which is below a predefined distance threshold du. The offset $d_{thd}$, which is typically equal to the thickness of the line marks, is considered to allow small gaps between V-H line segments due to pixel rounding off in edge detection and in line fitting techniques.

The inner product of each vertical line segment with each horizontal line segment of the shortlisted V-H pairs is calculated according to equation 7 below:

$$VH\ Angle = \arccos(V \cdot H/|V||H|) * 180/\pi \qquad \text{Equation (7)}.$$

To accommodate slots having different orientations with respect to the horizontal boundary, the angle of the V-H pair is not limited to 90°.

At 1090, a valid corner point pair (2 adjacent V-H pairs) is determined from the shortlisted V-H pairs. For example, a valid corner point pair, which includes 2 adjacent V-H pairs, is determined from the shortlisted V-H pairs. This is achieved by computing a confidence score which evaluates the geometric relationship between the set of two corners. The confidence score is based on the various characteristics of a parking slot. In one embodiment, the confidence score is based on the following characteristics: a) the width of what a parking slot should be within a predefined width or range; b) the vertical lines of two V-H pairs should be parallel; and c) the supplementary angle property. The confidence score is calculated based on equations 8a, 8b, 8c, and 8d.

Regarding equation 8a, it is as follows:

$$C_w = 1 - (\mathrm{abs}(\mathrm{Width}_R - \mathrm{Width}_A)/\mathrm{Width}_R) \qquad \text{Equation (8a)},$$

where
$C_w$, is the confidence score based on width,
$\mathrm{Width}_R$ is the reference width, and
$\mathrm{Width}_A$ is the actual width between two reference corners.
Regarding equation 8b, it is as follows:

$$C_v = 1 - (\mathrm{abs}(V\ \mathrm{Angle}_L - L\ \mathrm{Angle}_R)/90) \qquad \text{Equation (8b)},$$

where
$C_v$ is the confidence score based on the angles of two vertical lines,
$V\ \mathrm{Angle}_L$ is the angle of the vertical line forming the left corner, and
$V\ \mathrm{Angle}_R$ is the angle of the vertical line forming the right corner.
Equation 8c is as follows:

$$C_{hv} = 1 - (\mathrm{abs}((VH\ \mathrm{Angle}_L + VH\ \mathrm{Angle}_R) - 180)/180) \qquad \text{Equation (8c)},$$

where
$C_{hv}$ is the confidence score based on angles of the V-H pair,
$VH\ \mathrm{Angle}_L$, is the angle of the left V-H pair corner, and
$VH\ \mathrm{Angle}_R$ is the angle of the right V-H pair corner.
The VH Angles are calculated according to equation 7.
As for equation 8d, it is as follows:

$$C = C_w * C_v * C_{hv} \qquad \text{Equation (8d)}$$

where
C is the overall confidence score based on $C_w$, $C_v$, and $C_{hv}$.

The V-H pair with the highest confidence score is determined as the valid corner point pair. In the case where there are no corners, such as straight lines, equation 8c can be ignored.

Figure 10B:
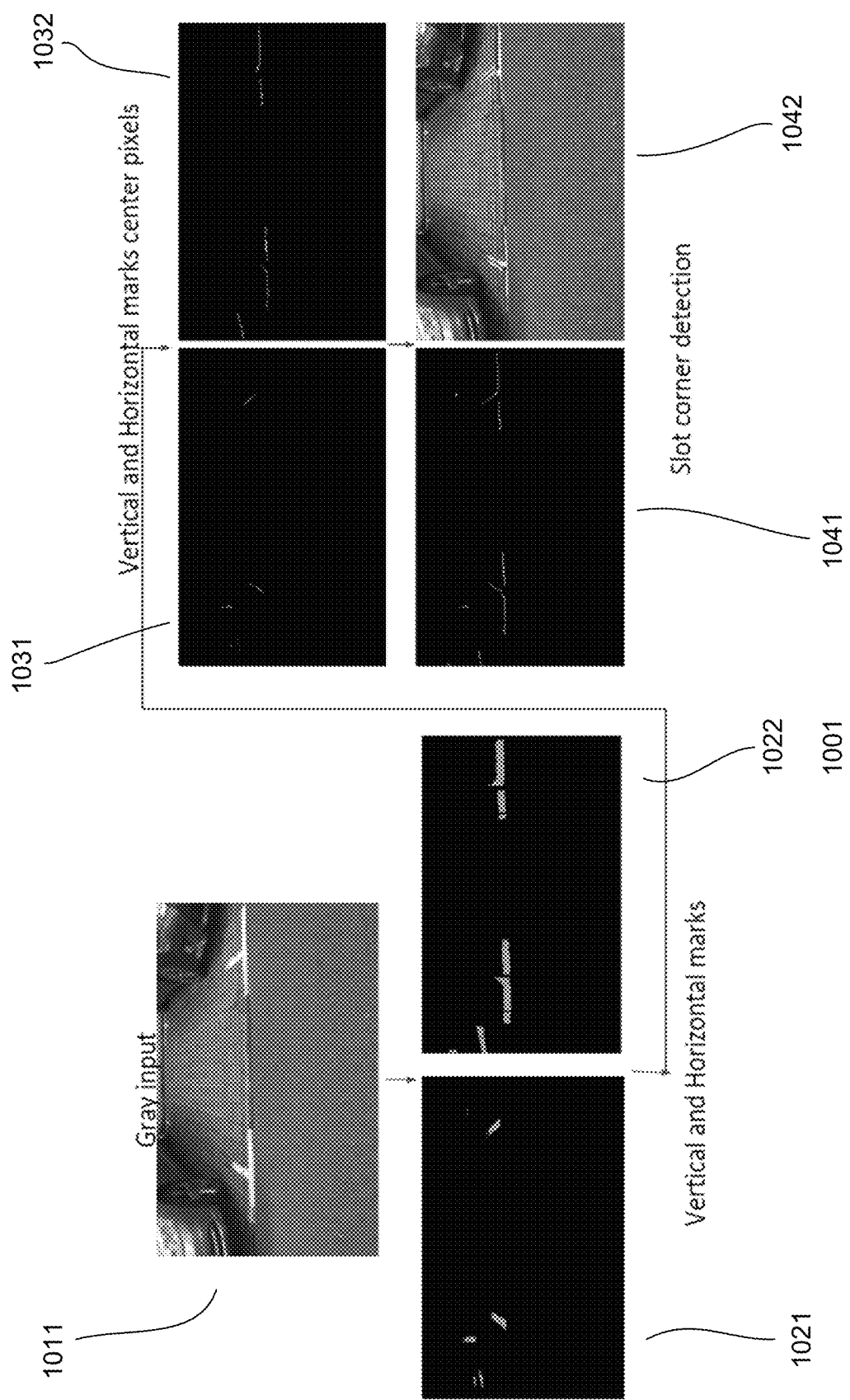
FIG. 10b depicts an embodiment of parking slot marking detection.

FIG. 10*b* depicts an example of a parking slot detection 1001. A grayscale image 1011 is provided for slot detection analysis. The horizontal lines and vertical line marks in the image are detected. For example, image 1021 shows the vertical line marks while image 1022 shows horizontal line marks. The center pixels of the vertical line marks are shown in image 1031 and the center pixels of the horizontal line marks are shown in image 1032. Based on the combination of V-H pairs, a valid corner point pair is determined, as shown in images 1041 and 1042.

As described, parking slot markings detection is performed after occupancy check. In other cases, the parking slot markings detection may be performed before occupancy check. Other configurations of various steps of parking slot detection and validation may also be useful.

An experiment comparing the performance of the present autonomous parking technique using HGMS and techniques using a you-only-look-once (YOLO) algorithm and a pixel gradient algorithm was conducted. Two YOLO techniques were tested, one being a default YOLO technique and the other was custom trained using transfer learning with a training dataset of 400 images. The comparison was performed with an Intel Core i7-7700HQ CPU @ 2.80 GHz, 8 core processor.

A test dataset of 623 different parking slots across different locations and at different times of the day was collected. Of the 632 parking slots, 402 were free slots and 221 were occupied slots. Among these slots, 65% are outdoor slots and about 10% of the slots have wet floors. Each slot data is a set of two successive image frames recorded at 20 fps, with both image frames containing parking slot markings of a parking slot. The test dataset is different from the training data set YOLO and pixel gradient are single frame techniques. As such, the first image frame of the parking slots was used. For the HGMS technique, both image frames were used.

Figure 11A:
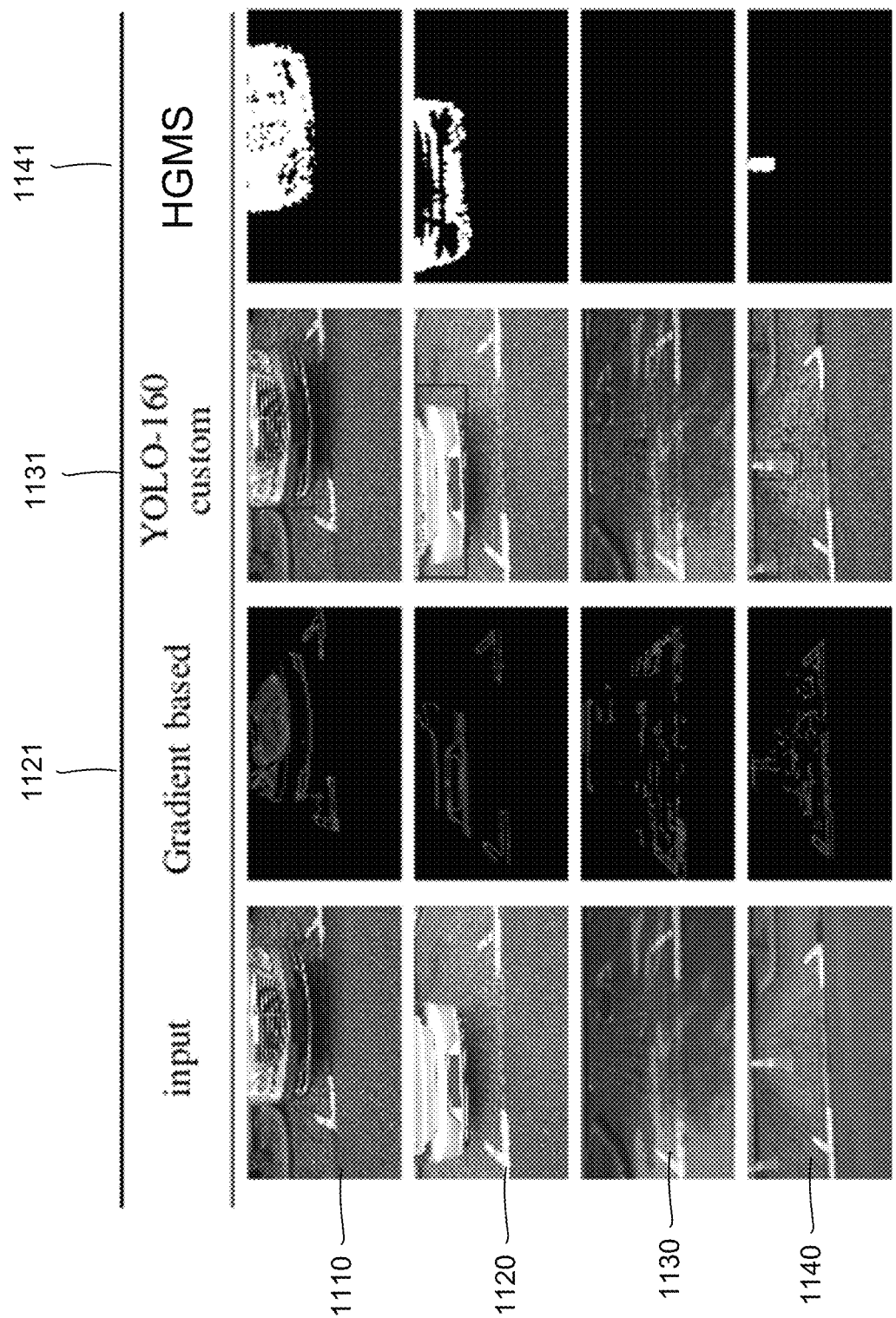
FIG. 11a shows a comparison of occupancy check of the different techniques based on different input images.

FIG. 11*a* shows a comparison of occupancy check of the different techniques based on different input images. First, second, third, and fourth input images 1110, 1120, 1130, and 1140 are compared. The first and second input images include vehicles with different colors, the third input image is an unoccupied slot with shadows, and the fourth input image is an occupied space with traffic cones as obstacles. The masks of obstacles detected using a pixel gradient-based technique are depicted in the second column 1121. The third column 1131 shows rectangular boxes bounding objects detected using YOLO-based custom trained technique while the last column 1141 presents masks of obstacles computed by the HGMS.

As shown, the pixel gradient-based technique detected the vehicles but failed to detect an empty slot. Shadows and floor gradient affected the pixel gradient-based system as it is entirely based on gradient variations. In addition, pixel gradient-based system failed to detect obstacles other than vehicles.

The default YOLO-based technique (not shown) failed to detect unknown objects such as cones. The custom trained YOLO-based system can detect different objects with which it has been trained to detect and worked well with shadows. However, with new types of objects with which the system has not been trained, additional data collection, annotation and custom training are required. Unlike the other techniques, the masks of obstacles generated by the HGMS successfully detected different types of obstacles and accurately determine empty slots.

FIG. 11*b* shows a table of scores for performance indicators for the different types of systems related to detecting a free parking slot. The performance indicators include precision (P), recall (R), and the F1 (or accuracy) score, which is equal to 2*(P*R)/(P+R). Based on the comparison analysis, it is observed that the pixel gradient-based system, although simple and fast, has limitations in handling situations with varying intensities. As for the YOLO-based custom trained system, it shows robust performance in scenarios having varying intensities with known object types. However, the performance is poor when unknown obstacles are present and is the slowest among the systems compared. In other words, the YOLO-based system is highly dependent on the quality of and variations in the dataset used for training.

The HGMS technique is able to process an image frame in 45 msec, which is near real-time. As for the YOLO-based technique, in addition to the dependency of training, processing a frame takes the longest time among the techniques compared. As shown, the HGMS technique achieves high performance ratings. Furthermore, the HGMS technique is not dependent on color and shape of the obstacles and exhibits superior occupancy detection for different textures and shadows in parking slots. For example, the HGMS technique is able to detect objects of different sizes such as cars, trees, traffic cones and others. This is primarily due to the underlying principles of motion estimation which are immune to these variations. With an F1 score of 97%, the HGMS performance is at par with the YOLO techniques with respect to known obstacles, shadows, dirt, wet surfaces, but at a rate which is near real-time.

The inventive concept of the present disclosure may be embodied in other specific forms without departing from the spirit or essential characteristics thereof. The foregoing embodiments, therefore, are to be considered in all respects illustrative rather than limiting the invention described herein. Scope of the invention is thus indicated by the appended claims, rather than by the foregoing description, and all changes that come within the meaning and range of equivalency of the claims are intended to be embraced therein.

The invention claimed is:

1. An autonomous parking system for a vehicle having a detection subsystem disposed in the vehicle comprising:
   an image capture module for capturing images to provide a camera stream; and
   a processor module, the processor module receives the camera stream and processes the camera stream, the processor module is configured to process image frames, wherein the processor module is configured to process a current image frame and a previous image frame of the camera stream
      to identify a parking slot, wherein the processor module is configured to perform motion analysis to identify the parking slot, wherein performing the motion analysis comprises
         determining apparent motion on dense optical flow of corresponding pixel pairs between the current image frame and the previous image frame,
         determining perspective rectified motion (PRM) by applying a perspectivity rectified factor to the apparent motion, wherein the perspectivity rectified factor is calculated using a homography matrix generated from camera unit calibration; and
         generating a motion histogram from the PRM to determine a ground motion estimation for detecting presence of obstacles,
      to check the parking slot to determine if it is occupied using motion analysis, and
      if unoccupied, to validate an unoccupied parking slot to determine if the unoccupied parking slot is suitable for the vehicle.

2. The system of claim 1 wherein the image capture module comprises:
   a first camera unit mounted on a first side of the vehicle, wherein the first camera unit is configured to capture images along the first side of the vehicle; and
   a second camera unit mounted on a second side of the vehicle, wherein the second camera unit is configured to capture images along the second side of the vehicle.

3. The system of claim 2 wherein the detection subsystem comprises a homography matrix generated from camera unit calibration for image to world position mapping.

4. The system of claim 1 wherein the processor module is configured to determine a parking slot size and a parking slot orientation of the parking slot.

5. The system of claim 4 wherein the processor module is configured to validate the parking slot based on a vehicle size and the parking slot size.

6. The system of claim 1 includes a controller subsystem, wherein the controller subsystem comprises:
   a vehicle information module, the vehicle information module is configured to receive vehicle information from the vehicle;
   a path planner module, the path planner module is configured to receive vehicle information from the vehicle information module and unoccupied parking slot information from the detection subsystem and based on the vehicle information and the unoccupied parking slot information, the path planner module plans a route to maneuver the vehicle into the unoccupied parking slot; and
   a controller module, the controller module is configured to receive the vehicle information from the vehicle information module and route information from the path planner module and generates control signals to the vehicle to control the vehicle for parking into the unoccupied parking slot.

7. A method for autonomously parking a vehicle comprising:
   performing apparent motion analysis of a current image frame and a previous image frame from an image capture module of the vehicle to generate apparent motion, wherein the apparent motion analysis determines a parking slot comprising
      computing ground motion estimation to segment the apparent motion into ground and obstacles,
      performing an occupancy check to determine if there are any obstacles present,
      checking if any obstacles are present and if no obstacles are present, the parking slot is unoccupied, and
      detecting parking slot markings if the parking slot is unoccupied to determine parking slot information; and
   validating the parking slot if the parking slot is unoccupied based on a vehicle size and a parking slot size.

8. The method of claim 7 wherein performing the motion analysis includes performing homography guided motion segmentation (HGMS), wherein the HGMS comprises performing camera calibration to generate homography information comprising a homography matrix for image to world mapping and a perspectivity ratio (PR) map.

9. The method of claim 7 wherein detecting the parking slot markings comprises:
   analyzing the current image frame to identify vertical (V) and horizontal (H) lines;
   determining V-H line combinations; and
   identifying valid corner points from the V-H line combinations.

10. The system of claim 1 wherein the processor module is further configured to:
- determine reference ground plane motion using homography guided reference motion analysis;
- perform reference compensation on the dense optical flow generated during the motion analysis to produce obstacle flow; and
- applying a homography guided threshold to the obstacle flow to generate masked obstacle flow with obstacle masks for identifying obstacles.

11. The system of claim 10 wherein the reference ground plane motion is determined from a motion histogram generated during ground motion estimation.

12. The system of claim 10 wherein the processor module is configured to check the parking slot to determine whether it is occupied based on the masked obstacle flow.

13. The system of claim 1 wherein the processor is configured to detect parking slot markings to determine parking slot information for validating the unoccupied parking slot, wherein detecting the parking slot marking comprises
- analyzing the current image frame to identify vertical (V) and horizontal (H) lines,
- determining V-H line combinations, and
- identifying valid corner points from the V-H line combinations.

14. The method of claim 7 wherein the apparent motion is generated based on dense optical flow of corresponding pixel pairs between the current image frame and the previous image frame.

15. The method of claim 14 wherein the motion analysis further comprises
- determining perspective rectified motion (PRM) by applying a perspectivity rectified factor to the apparent motion, wherein the perspectivity rectified factor is calculated using a homography matrix generated from camera unit calibration; and
- generating a motion histogram from the PRM to compute the ground motion estimation.

16. The method of claim 14 wherein checking the parking slot to determine if the parking slot is occupied comprises
- determining reference ground plane motion using homography guided reference motion analysis;
- performing reference compensation on the dense optical flow to produce obstacle flow; and
- applying a homography guided threshold to the obstacle flow to generate masked obstacle flow with obstacle masks for identifying obstacles.

17. The method of claim 16 wherein the reference ground plane motion is determined from a motion histogram generated during ground motion estimation.

* * * * *